(12) United States Patent
Park et al.

(10) Patent No.: US 12,026,078 B1
(45) Date of Patent: Jul. 2, 2024

(54) DEVICE AND METHOD FOR PROVIDING BENCHMARK RESULT OF ARTIFICIAL INTELLIGENCE BASED MODEL

(71) Applicant: NOTA, INC., Daejeon (KR)

(72) Inventors: Sanggeon Park, Seoul (KR); Jimin Lee, Seoul (KR)

(73) Assignee: NOTA, INC., Daejeon (KR)

( * ) Notice: Subject to any disclaimer, the term of this patent is extended or adjusted under 35 U.S.C. 154(b) by 0 days.

(21) Appl. No.: 18/346,082

(22) Filed: Jun. 30, 2023

(30) Foreign Application Priority Data

Feb. 27, 2023 (KR) .......................... 10-2023-0026147

(51) Int. Cl.
*G06F 11/34* (2006.01)
(52) U.S. Cl.
CPC ...... *G06F 11/3428* (2013.01); *G06F 11/3423* (2013.01)
(58) Field of Classification Search
CPC .......................... G06F 11/3423; G06F 11/3428
USPC ......................................................... 702/182
See application file for complete search history.

(56) References Cited

U.S. PATENT DOCUMENTS

| 1,019,301 | A | 3/1912 | Burrowes |
| 9,886,374 | B1 | 2/2018 | Kuo et al. |
| 2020/0042419 | A1* | 2/2020 | Wei .................. G06N 20/00 |
| 2022/0101063 | A1 | 3/2022 | Chau et al. |
| 2022/0121916 | A1 | 4/2022 | Joo et al. |
| 2022/0121927 | A1 | 4/2022 | O'Connor |
| 2022/0237460 | A1 | 7/2022 | Joo et al. |
| 2022/0335293 | A1 | 10/2022 | Choi et al. |

FOREIGN PATENT DOCUMENTS

| KR | 2020-0052417 | A | 5/2020 |
| KR | 202000052417 | A | 5/2020 |
| KR | 20210045845 | A | 4/2021 |
| KR | 20220052771 | A | 4/2022 |
| KR | 20220109826 | A | 8/2022 |
| KR | 20220144281 | A | 10/2022 |
| KR | 102461997 | B1 | 11/2022 |
| KR | 102500341 | B1 | 2/2023 |

* cited by examiner

*Primary Examiner* — John H Le
(74) *Attorney, Agent, or Firm* — Seed IP Law Group LLP

(57) ABSTRACT

Disclosed is a method for providing a benchmark result, which is performed by a computing device. The method may include obtaining a first input data including an inference task and a dataset. The method may include determining a target model which is a subject of a benchmark for the inference task and at least one target node at which the inference task of the target model is to be executed. The determined target model corresponds to an artificial intelligence-based model, and the benchmark for the inference task of the determined target model is performed at the at least one target node based on the dataset. The method may include providing the benchmark result obtained by executing the target model at the at least one target node.

18 Claims, 12 Drawing Sheets

| | First node | Second node | Third node | Fourth node |
|---|---|---|---|---|
| First operator | 3ms | 6ms | 2ms | 10ms |
| Second operator | 4ms | 7ms | 4ms | 8ms |
| Third operator | 5ms | 15ms | 10ms | 6ms |
| Fourth operator | 7ms | 6ms | 6ms | 8ms |

600

610

|  | First operator | Second operator | Third operator | Fourth operator |
|---|---|---|---|---|
| First operator | 4ms | 6ms | 2ms | 10ms |
| Second operator | 5ms | 7ms | 4ms | 8ms |
| Third operator | 4ms | 15ms | 10ms | 6ms |
| Fourth operator | 7ms | 6ms | 6ms | 8ms |

|  | Second model | Third model | Fourth model | Fifth model |
|---|---|---|---|---|
| 1-1st operator | 1-1st operator | 1-3rd operator | 1-3rd operator | 1-1st operator |
| 2-1st operator | 1-2nd operator | 1-4th operator | 1-4th operator | 2-1st operator |
| 3-1st operator | 3-1st operator | 3-2nd operator | 3-3rd operator | 3-3rd operator |
| 4-1st operator | 4-1st operator | 4-1st operator | 4-1st operator | 4-1st operator |

DEVICE AND METHOD FOR PROVIDING BENCHMARK RESULT OF ARTIFICIAL INTELLIGENCE BASED MODEL

CROSS-REFERENCE TO RELATED APPLICATIONS

This application claims priority to and the benefit of Korean Patent Application No. 10-2023-0026147 filed in the Korean Intellectual Property Office on Feb. 27, 2023, the entire contents of which are incorporated herein by reference.

BACKGROUND

Technical Field

The present disclosure relates to artificial intelligence technology, and more particularly, to benchmark technology for an artificial intelligence based model.

Description of the Related Art

Due to the development of artificial intelligence technology, various types of artificial intelligence based models are being developed. A demand for computational resources to process various AI based models is also increasing, and the development of hardware with new abilities in related industries is continuously developed.

As a demand for edge artificial intelligence, which can lead to direct operation in terminals on networks such as personal computers, smartphones, cars, wearable devices and robots, increases, a research into an AI based model considering hardware resources considering hardware resources is conducted.

As the importance of hardware in the artificial intelligence technology increases with the development of the edge AI technology as such, in order to develop and launch artificial intelligence based solutions, sufficient knowledge of various hardware in which the artificial intelligence based models are to be executed is also required jointly as well as the artificial intelligence based models. For example, even if there is a model with excellent performance in a specific domain, inference performance for these models can be different for each hardware where the model is to be executed. There can also be a situation in which a model having optimal performance is not supported in specific hardware in which a service is to be provided in a specific domain. Accordingly, in order to determine the artificial intelligence based model suitable for the service to be provided and hardware suitable for the artificial intelligence based model jointly, high levels of background knowledge and vast amounts of resources for the artificial intelligence technology and hardware technology can be required.

BRIEF SUMMARY

The present disclosure has been made in an effort to efficiently provide a benchmark result of a specific model in a specific node.

However, technical objects of the present disclosure are not restricted to a technical object mentioned above, and other technical objects not mentioned will be able to be apparently appreciated by those skilled in the art.

An exemplary embodiment of the present disclosure provides a method for providing a benchmark result, performed by a computing device. The method may include: obtaining a first input data including an inference task; determining a target model which is a subject of a benchmark for the inference task and determining at least one target node at which the inference task of the target model is to be executed, based on a candidate node list including candidate nodes recommended for the benchmark for the inference task, wherein the determined target model corresponds to an artificial intelligence-based model of which the benchmark for the inference task is performed at the at least one target node based on a dataset, and the candidate node list comprises, identification information for each of the candidate nodes and estimated latency information for each of the candidate nodes when the target model is executed; and providing the benchmark result obtained by executing the target model at the at least one target node.

In an exemplary embodiment, the determining the at least one target node may include: providing a candidate node list including candidate nodes recommended for the benchmark of the inference task; and determining the at least one target node based on a second input data which selects the at least one target node within the candidate node list.

In an exemplary embodiment, the candidate node list may include: identification information for each of the candidate nodes, and estimated latency information for each of the candidate nodes when the target model is executed.

In an exemplary embodiment, an arrangement order of the candidate nodes included in the candidate node list may be determined based on a size of a value of the estimated latency information.

In an exemplary embodiment, an arrangement order between a first candidate node and a second candidate node is determined based on memory usage and CPU occupancy of the first candidate node and the second candidate node, when a difference in values of the estimated latency information between the first candidate node and the second candidate node among the candidate nodes is within a predetermined threshold range.

In an exemplary embodiment, the candidate node list may include: power mode information indicating usage of a CPU core for at least some of the candidate nodes; and fan mode information indicating usage of a fan for at least some of the candidate nodes.

In an exemplary embodiment, the candidate node list may include: information for at least one model supportable by each of the candidate nodes; library information required to install at least one model supportable by each of the candidate nodes; and power usage information indicating power usage obtained from power measurement sensors connected to the candidate nodes.

In an exemplary embodiment, a model size may be determined based on size of the dataset of the first input data, and the candidate node list may include candidate nodes having a memory space exceeding the determined model size.

In an exemplary embodiment, the providing the candidate node list may include including second nodes into the candidate node list as the candidate nodes, wherein the second nodes have an execution environment that does not support a first operator included in an inputted source model but supports a second operator that is able to replace the first operator, and wherein the second operator is different from the first operator.

In an exemplary embodiment, the benchmark result may include: preprocessing time information required for preprocessing of inference of the target model at the at least one target node; inference time information required for inference of the target model at the at least one target node;

preprocessing memory usage information used for preprocessing of inference of the target model at the at least one target node; and inference memory usage information required for inference of the target model at the at least one target node In an exemplary embodiment, the benchmark result may include: quantitative information related to an inference time, which is obtained by repeated inferences of the target model in a predetermined number of times at the at least one target node; and quantitative information related to memory usage for each of an NPU, a CPU, and a GPU, obtained by inference of the target model at the at least one target node.

In an exemplary embodiment, the providing the benchmark result obtained by executing the target model at the at least one target node may include: distinguishing a node capable of wireless communication and a node which is not capable of wireless communication at the at least one target node; transmitting a benchmark task to the node capable of wireless communication corresponding to the node which is not capable of wireless communication, so that the node capable of wireless communication connects to the node which is not capable of wireless communication by using a serial communication, to obtain a benchmark result from the node which is not capable of wireless communication.

In an exemplary embodiment, the providing the benchmark result when a third node unidentifiable from outside is included in the at least one target node may include: transmitting to the third node a first acknowledgement message including a benchmark task for benchmarking the target model at the third node, in response to receiving a first low power wireless signal from the third node; and receiving from the third node a second low power wireless signal including a benchmark result generated by the third node.

In an exemplary embodiment, the providing the benchmark result when a third node unidentifiable from outside is included in the at least one target node may further include: determining that the benchmark task at the third node has failed and setting the third node to an inactive state, if the second low power wireless signal is not received for a predetermined threshold standby time; and setting the third node to an active state in response to receiving a third low power wireless signal from the third node set as the inactive state.

In an exemplary embodiment, the first low power wireless signal may include: whether the third node is performing a benchmark, a memory usage of the third node and hardware identification information of the third node.

In an exemplary embodiment, the benchmark task included in the first acknowledgment message may include: target model information downloadable by the third node, and node configuration information used for converting the target model that the third node has downloaded, and the benchmark result generated by the third node may include a result obtained by executing the target model in an execution environment of the third node based on the target model information and the node configuration information.

In an exemplary embodiment, information of a target model supportable by at least one target node included in the second input data may be automatically provided, based on the second input data.

In an exemplary embodiment, the information of the target model may include: identification information corresponding to a target model supportable by the at least one target node, and software version information of a target model supportable by the at least one target node.

In an exemplary embodiment, in response to receiving second input data selecting the at least one target node in the candidate node list, i) the at least one target node can be determined and ii) information for recommending a target model supportable by the at least one target node to determine the target model can be provided. Wherein the information for recommending the target model comprises identification information corresponding to a recommended target model, and software version information of a recommended target model.

Another exemplary embodiment of the present disclosure provides a computer program stored in a computer readable medium. The computer program may allow a computing device to perform following operations to provide a benchmark result when executed by the computing device, and the operations may include: obtaining a first input data including an inference task; determining a target model which is a subject of a benchmark for the inference task and determining at least one target node at which the inference task of the target model is to be executed, based on a candidate node list including candidate nodes recommended for the benchmark for the inference task, wherein the determined target model corresponds to an artificial intelligence-based model, the benchmark for the inference task of the determined target model is performed at the at least one target node based on a dataset, and the candidate node list comprises, identification information for each of the candidate nodes and estimated latency information for each of the candidate nodes when the target model is executed; and providing the benchmark result obtained by executing the target model at the at least one target node.

Yet another exemplary embodiment of the present disclosure provides a computing device for generating a benchmark result. The computing device may include: at least one processor; and a memory. The at least one processor may obtain a first input data including an inference task; determine a target model which is a subject of a benchmark for the inference task and determining at least one target node at which the inference task of the target model is to be executed, based on a candidate node list including candidate nodes recommended for the benchmark for the inference task, wherein the determined target model corresponds to an artificial intelligence-based model, the benchmark for the inference task of the determined target model is performed at the at least one target node based on a dataset, and the candidate node list comprises, identification information for each of the candidate nodes and estimated latency information for each of the candidate nodes when the target model is executed; and provide the benchmark result obtained by executing the target model at the at least one target node.

According to an exemplary embodiment of the present disclosure, a technique can provide a benchmark result of a specific model in a specific node in an efficient scheme.

BRIEF DESCRIPTION OF THE SEVERAL VIEWS OF THE DRAWINGS

FIG. 6 illustratively illustrates a table type data structure used for generating a candidate node list according to an exemplary embodiment of the present disclosure.

FIG. 7 illustratively illustrates a table type data structure used for generating a candidate node list according to an exemplary embodiment of the present disclosure.

DETAILED DESCRIPTION

Figure 1:
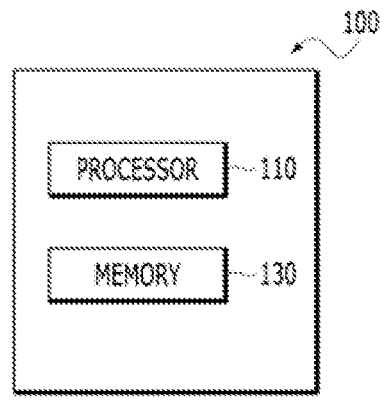
FIG. 1 schematically illustrates a block diagram of a computing device according to an exemplary embodiment of the present disclosure.

Various exemplary embodiments will be described with reference to drawings. In the specification, various descriptions are presented to provide appreciation of the present disclosure. Prior to describing detailed contents for carrying out the present disclosure, it should be noted that configurations not directly associated with the technical gist of the present disclosure are omitted without departing from the technical gist of the present disclosure. Further, terms or words used in this specification and claims should be interpreted as meanings and concepts which match the technical spirit of the present disclosure based on a principle in which the inventor can define appropriate concepts of the terms in order to describe his/her disclosure by a best method.

"Module," "system," and the like which are terms used in the specification refer to a computer-related entity, hardware, firmware, software, and a combination of the software and the hardware, or execution of the software, and interchangeably used. For example, the module may be a processing procedure executed on a processor, the processor, an object, an execution thread, a program, application and/or a computing device, but is not limited thereto. One or more modules may reside within the processor and/or a thread of execution. The module may be localized in one computer. One module may be distributed between two or more computers. Further, the modules may be executed by various computer-readable media having various data structures, which are stored therein. The modules may perform communication through local and/or remote processing according to a signal (for example, data from one component that interacts with other components and/or data from other systems transmitted through a network such as the Internet through a signal in a local system and a distribution system) having one or more data packets, for example.

Moreover, the term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" and "at least one" used in this specification designates and includes all available combinations of one or more items among enumerated related items. For example, the term "at least one of A or B" or "at least one of A and B" should be interpreted to mean "a case including only A," "a case including only B," and "a case in which A and B are combined."

Further, it should be appreciated that the term "comprise/include" and/or "comprising/including" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

Those skilled in the art need to recognize that various illustrative logical components, blocks, modules, circuits, means, logics, and algorithms described in connection with the exemplary embodiments disclosed herein may be additionally implemented as electronic hardware, computer software, or combinations of both sides. To clearly illustrate the interchangeability of hardware and software, various illustrative components, blocks, means, logics, modules, circuits, and steps have been described above generally in terms of their functionalities. Whether the functionalities are implemented as the hardware or software depends on a specific application and design restrictions given to an entire computing device.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

Terms expressed as N-th such as first, second, or third in the present disclosure are used to distinguish at least one entity. For example, entities expressed as first and second may be the same as or different from each other. Further, terms expressed as 1-1st, 1-2nd, 1-Nth, etc., may be used to be distinguished from each other.

The term "benchmark" used in the present disclosure may mean an operation of executing or testing the model on a node, or an operation of measuring the performance of the node of the model. In the present disclosure, a benchmark result or benchmark result information may include information that is acquired according to the benchmark, or information acquired by processing the information acquired according to the benchmark.

The term "artificial intelligence based model" used in the present disclosure can be used interchangeably with the artificial intelligence model, an operational model, a neural network, a network function, a neural network, and the model. The model in the present disclosure may be used as a meaning that encompasses a model file and/or model type information. In an exemplary embodiment, the model type information may mean information for identifying an execution environment, a framework or a type of the model. For example, TensorRT, Tflite, and Onnxruntime may be included in the model type information.

The term "node" used in the present disclosure may correspond to the hardware information that is subject to the benchmark for the model. The hardware information can be used as a meaning that encompasses physical hardware, virtual hardware, hardware that cannot be network accessible from outside, hardware that cannot be identifiable from outside, and/or hardware that is identifiable in a cloud. For example, the node in the present disclosure may include various types of hardware such as Raspberrypi, Coral, Jetson-Nano, AVH Rasberrypi, and Mobile.

In the present disclosure, the term "a subject of a benchmark" may be used to refer to a target on which a benchmark is performed (e.g., a benchmark target).

In the present disclosure, the node in the artificial intelligence based model can be used to mean a component that constitutes the neural network, for example and the node in the neural network may correspond to neuron.

FIG. 1 schematically illustrates a block diagram of a computing device 100 according to an exemplary embodiment of the present disclosure.

The computing device 100 according to an exemplary embodiment of the present disclosure may include a processor 110 and a memory 130.

A configuration of the computing device 100 illustrated in FIG. 1 is only an example simplified and illustrated. In an exemplary embodiment of the present disclosure, the computing device 100 may include other components for performing a computing environment of the computing device 100, and only some of the disclosed components may constitute the computing device 100.

The computing device 100 in the present disclosure may be interchangeably used with the computing device, and the computing device 100 may be used as a meaning that encompasses an any type of server and an any type of terminal.

The computing device 100 in the present disclosure may mean an any type of component constituting a system for implementing the exemplary embodiments of the present disclosure.

The computing device 100 may mean an any type of user terminal or an any type of server. The components of the computing device 100 are exemplary, and some components may be excluded or an additional component may also be included. As an example, when the computing device 100 includes the user terminal, an output unit (not illustrated) and an input unit (not illustrated) may be included in a range of the computing device 100.

In an exemplary embodiment, the computing device 100 may mean a device that communicates with a plurality of nodes to manage and/or perform a benchmark for a plurality of nodes of a specified artificial intelligence based model. For example, the computing device 100 may be referred to as a device farm. In an exemplary embodiment, the computing device 100 may mean a device that interacts with a user to generate a learning model, generate a compressed model, and generate download data for deployment of the model. In an exemplary embodiment, the computing device 100 may mean a device that manages and/or performs the benchmark for the plurality of nodes of the artificial intelligence based model, generates the learning model by interaction with the user, generates the compressed model, and generates the download data for the deployment of the model.

In an exemplary embodiment, the computing device 100 may also mean a device that generates the learning model through modeling for an input dataset, generates a compressed model through compression for an input model, and/or generates the download data so that the input model may be deployed in a specific node. In the present disclosure, the deploy or deployment may mean an arbitrary type of activity which enables using software (e.g., model). For example, the deploy or deployment may be interpreted as an overall process which is customized according to a specific requirement or feature of the model or node. As an example for the deploy or deployment, there may be release, installation and activation, deactivation, removal, update, built-in update, adaptation, and/or version tracking.

The computing device 100 in the present disclosure may perform technical features according to exemplary embodiments of the present disclosure to be described below.

For example, the computing device 100 may determine whether to convert the artificial intelligence based model based on the model type information of the artificial intelligence based model inputted for the benchmark and target type information for identifying the model type which is subject to the benchmark, provide a candidate node list including candidate nodes based on the target type information, determine, based on input data for selecting at least one target node in the candidate node list, the at least one target node, and provide a benchmark result acquired as a target model acquired according to whether to convert the artificial intelligence based model is executed in the at least one target node.

For example, the computing device 100 may acquire first input data including an inference task and/or a dataset, determine a target model which is subject to the benchmark for the inference task and at least one target node in which the inference task of the target model is to be executed, and provide a benchmark result acquired as the target model is executed in the at least one target node.

For example, the computing device 100 may receive, from another computing device including a plurality of modules performing different operations from the artificial intelligence based model, module identification information indicating which module among a plurality of modules of another computing device triggers a benchmark operation of the computing device 100, and provide the benchmark result to the another computing device based on the module identification information. Here, the benchmark result provided to the another computing device may be different according to the module identification information.

In another exemplary embodiment of the present disclosure, the computing device 100 may also acquire a result of performing the benchmark from another computing device or an external entity. In another exemplary embodiment of the present disclosure, the computing device 100 may also acquire a result of performing converting from another computing device or an external entity (e.g., a converting device).

In an exemplary embodiment, the processor 110 may be constituted by at least one core, and include processors for data analysis and processing, such as a central processing unit (CPU), a general purpose graphics processing unit (GPGPU), a tensor processing unit (TPU), etc., of the computing device 100.

The processor 110 may read a computer program stored in the memory 130 to provide the benchmark result according to an exemplary embodiment of the present disclosure.

According to an exemplary embodiment of the present disclosure, the processor 110 may perform an operation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, the GPGPU, and the TPU of the processor 110 may process learning of the network function. For example, the CPU and the GPGPU may process the learning of the network function and data classification using the network function. Further, in an exemplary embodiment of the present disclosure, learning of the network function and data classification using the network function may also be processed by using processors of a plurality of computing devices. In addition, the computer program performed by the computing device 100 according to an exemplary embodiment of the present disclosure may be a CPU, GPGPU, or TPU executable program.

Additionally, the processor 110 may generally process all operations of the computer device 100. For example, the processor 110 processes data, information, or a signal input or output through the components included in the computing device 100 or drives an application program stored in a storage unit to provide an appropriate information or function to a user.

According to an exemplary embodiment of the present disclosure, the memory 130 may store various types of information generated or determined by the processor 110 or various types of information received by the computing device 100. According to an exemplary embodiment of the present disclosure, the memory 130 may be a storage medium storing computer software which performs the operations according to the exemplary embodiments of the present disclosure by the processor 110. Therefore, the memory 130 may also mean computer reading media for storing a software code required for performing the exemplary embodiment of the present disclosure, data which becomes an execution target of the code, and an execution result of the code.

The memory 130 according to an exemplary embodiment of the present disclosure may mean an arbitrary type of storage medium. For example, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may also operate in connection with a web storage performing a storing function of the memory 130 on the Internet. The disclosure of the memory is just an example, and the memory 130 used in the present disclosure is not limited to the examples.

A communication unit (not illustrated) in the present disclosure may be configured regardless of communication modes such as wired and wireless modes and constituted by various communication networks including a personal area network (PAN), a wide area network (WAN), and the like. Further, the network unit 150 may be the known World Wide Web (WWW) and may adopt a wireless transmission technology used for short-distance communication, such as infrared data association (IrDA) or Bluetooth.

The computing device 100 in the present disclosure may include various types of user terminal and/or various types of server. Therefore, the exemplary embodiments of the present disclosure may be performed by the server and/or the user terminal.

In an exemplary embodiment, the user terminal may include an arbitrary type of terminal which is capable of interacting with the server or another computing device. The user terminal may include, for example, a cellular phone, a smart phone, a laptop computer, a personal digital assistant (PDA), a slate PC, a tablet PC, and an ultrabook.

In an exemplary embodiment, the server may include, for example, various types of computing system or computing device such as a microprocessor, a mainframe computer, a digital processor, a portable device, and a device controller.

In an exemplary embodiment, the server may store and manage the benchmark result, the candidate node list, performance information of nodes, latency information between the node and the model, and/or converting result information. The server may include a storage unit (not illustrated) for storing the benchmark result, the candidate node list, performance information of nodes, latency information between the node and the model, and/or converting result information. The storage unit may be included in the server or may exist under management of the server. As another example, the storage unit may exist outside the server and may also be implemented in a communicatable form with the server. In this case, the storage unit may be managed and controlled by another external server different from the server. As another example, the storage unit may exist outside the server and may also be implemented in a communicatable form with the server. In this case, the storage unit may be managed and controlled by another external server different from the server.

Figure 2:
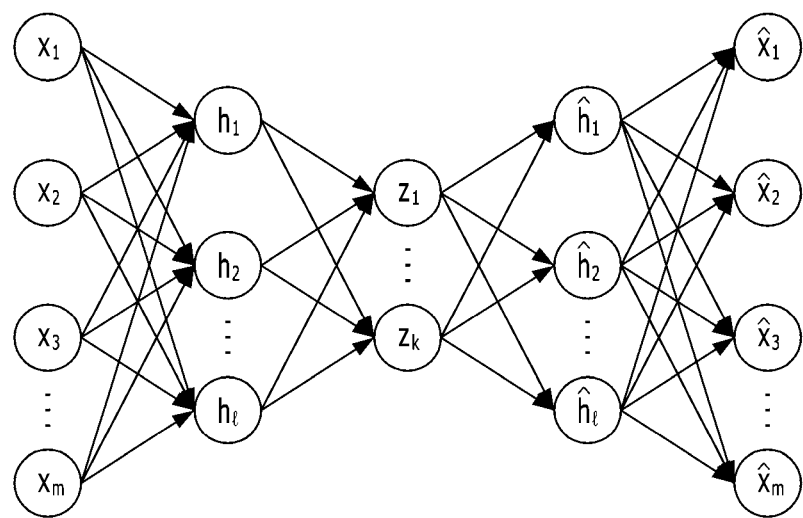
FIG. 2 illustrates an exemplary structure of an artificial intelligence based model according to an exemplary embodiment of the present disclosure.

FIG. 2 illustrates an illustrative structure of an artificial intelligence based model according to an exemplary embodiment of the present disclosure.

Throughout the present disclosure, the model, the artificial intelligence model, the artificial intelligence based model, the operation model, and the neural network, the network function, and the neural network may be used interchangeably.

The artificial intelligence based model in the present disclosure may include models which are utilizable in various domains, such as a model for image processing such as object segmentation, object detection, and/or object classification, a model for text processing such as data prediction, text semantic inference and/or data classification, etc.

The neural network may be generally constituted by an aggregate of calculation units which are mutually connected to each other, which may be called "node." The nodes may also be called neurons. The neural network is configured to include one or more nodes. The nodes (or neurons) constituting the neural networks may be mutually connected to each other by one or more links.

The node in the artificial intelligence based model may be used to mean a component that constitutes the neural network, and for example, the node in the neural network may correspond to the neuron.

In the neural network, one or more nodes connected through the link may relatively form a relationship between an input node and an output node. Concepts of the input node and the output node are relative and a predetermined node which has the relationship of the output node with respect to one node may have the relationship of the input node in the relationship with another node and vice versa. As described above, the relationship of the output node to the input node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable, and the weight may be varied by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form the input node and output node relationship in the neural network. A characteristic of the neural network may be determined according to the number of nodes, the number of links, correlations between the nodes and the links, and values of the weights granted to the respective links. For example, when the same number of nodes and links exist and two neural networks in which the weight values of the links are different from each other exist, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed from the initial input node up to the corresponding node. However, definition of the layer is predetermined for description and the order of the layer in the neural network may be defined by a method different from the aforementioned method. For example, the layers of the nodes may be defined by the distance from a final output node.

In an exemplary embodiment of the present disclosure, the set of the neurons or the nodes may be defined as the expression "layer."

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

The deep neural network (DNN) may mean a neural network including a plurality of hidden layers other than the input layer and the output layer. When the deep neural network is used, the latent structures of data may be identified. That is, photographs, text, video, voice, protein sequence structure, genetic sequence structure, peptide sequence structure, potential structure of music (e.g., what objects are in the photo, what is the content and emotions of the text, what contents and emotions of the voice, etc.), and/or the binding affinity between the peptide and the MHC may be identified. The deep neural network may include convolutional neural network (CNN), recurrent neural network (RNN), auto encoder, generative adversarial networks (GAN), restricted Boltzmann machine (RBM), deep belief network (DBN), Q network, U network, Siamese network, etc. The description of the deep neural network described above is just an example and the present disclosure is not limited thereto.

The artificial intelligence based model of the present disclosure may be expressed by a network structure of an arbitrary structure described above, including the input layer, the hidden layer, and the output layer.

The neural network which may be used in a clustering model in the present disclosure may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (e.g., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (e.g., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

According to an exemplary embodiment of the present disclosure, a computer readable medium is disclosed, which stores a data structure including the benchmark result and/or the artificial intelligence based model. The data structure may be stored in a storage unit (not illustrated) in the present disclosure, and executed by the processor 110 and transmitted and received by a communication unit (not illustrated).

The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device may perform operations while using the resources of the computing device to a minimum. Specifically, the computing device may increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for learning the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for learning the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called "node." The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight may be varied by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, R-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example, and the present disclosure is not limited thereto.

Figure 3:
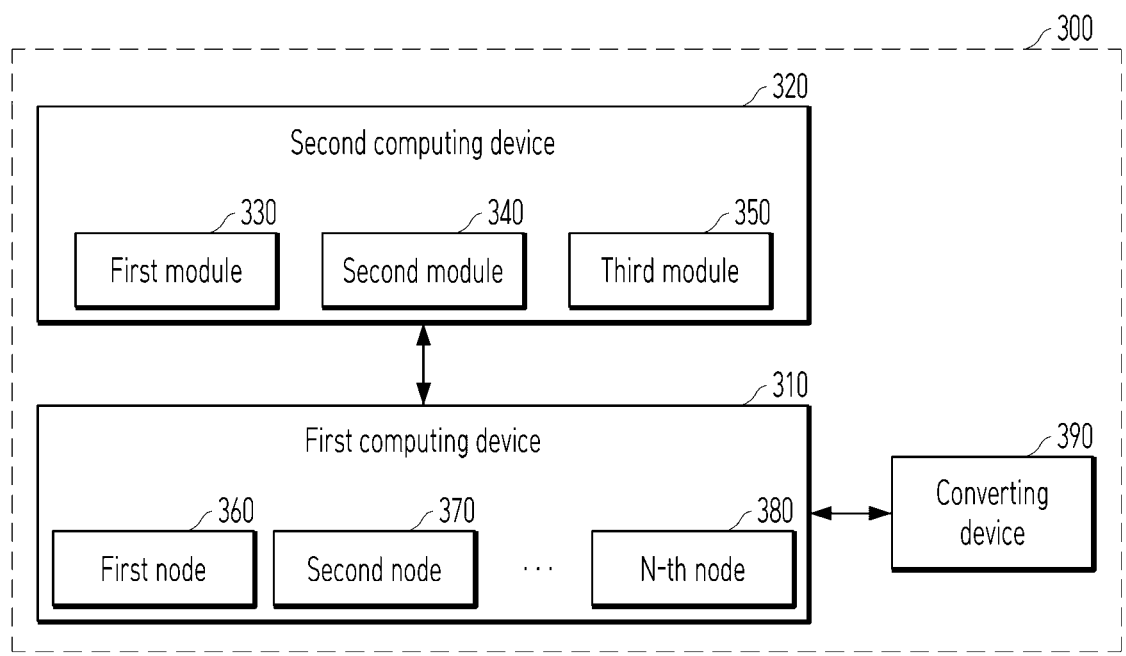
FIG. 3 is an exemplary schematic view for a system for providing a benchmark result according to an exemplary embodiment of the present disclosure.

FIG. 3 is an exemplary schematic view for a system 300 for providing a benchmark result according to an exemplary embodiment of the present disclosure.

In an exemplary embodiment, a second computing device 320 may include a plurality of modules that performs different operations related to the artificial intelligence based model. For example, the second computing device 320 may include a first module 330, a second module 340, and a third module 350. In an exemplary embodiment, the first module 330 may generate the learning model based on an input dataset. The second module 340 compresses the input model to generate the compressed model. The third module 350 may generate the download data for deploying the input model in at least one target node. In the example of FIG. 3, three modules are taken as an example, but it will be appreciated by those skilled in the art that various numbers of modules may be included in the second computing device 320 according to an aspect of implementation.

In an exemplary embodiment, the first computing device 310 and the second computing device 320 interact with each other to provide the benchmark result to the user. For example, the first computing device 310 may provide the benchmark result required for the operation of the second computing device 320 to the second computing device 320 in response to a request of the second computing device 320.

In an exemplary embodiment, in FIG. 3, the first computing device 310 is expressed as a separate entity outside the second computing device 320, but according to the implementation aspect, the first computing device 310 may also operate as an integrated type of module of the second computing device 320.

In an exemplary embodiment, the first computing device 310 may receive a request related to the benchmark from entities other than the second computing device 320, and also provide the benchmark result in response. For example, the first computing device 310 may provide a result for the benchmark of the artificial intelligence based model (e.g., a learning model or a compression model made by the user) prepared by the user.

In an exemplary embodiment, the first computing device 310 may receive module identification information indicating which module triggers the benchmark operation of the first computing device 310, among the plurality of modules of the second computing device 320, and provide the benchmark result to the second computing device 320 based on the module identification information. The benchmark result provided to the second computing device 320 may be different according to the module identification information. For example, when the module identification information indicates the first module 330, the first computing device 310 may provide performance information to the second computing device 320 for all input models, when the module identification information indicates the second module 340, the first computing device 310 may provide the performance information to the second computing device 320 for all input models, and provide the performance information by the unit of the block of the input model. As another example, when the module identification information indicates the first module 330, the first computing device 310 may provide a benchmark result for determining a target node to execute a learning model corresponding to an input dataset or a converted learning model to the second computing device 320, and when the module identification information indicates the second module 340, the first computing device 310 may provide a benchmark result including configuration data used for generating the compressed model corresponding to the input model to the second computing device 320.

In an exemplary embodiment, the first computing device 310 may correspond to an entity that manages a plurality of nodes. The first computing device 310 may perform the benchmark for nodes included in a node list including a first node 360, a second node 370, . . . , an N-th node 380. In FIG. 3, it is illustrated that the first node 360, the second node 370, . . . , the N-th node 380 are included in the first computing device 310, but according to the implementation aspect, the first node 360, the second node 370, . . . , the N-th node 380 may be present outside the first computing device 310 to interact with each other through communication with the first computing device 310.

In an exemplary embodiment, the first computing device 310 may generate the benchmark result for the plurality of nodes in response to the request from the user and/or the request from the second computing device 320. In an exemplary embodiment, the first computing device 310 interacts with the converting device 390 in response to the request from the user and/or the request from the second computing device 320 to generate the benchmark result for the plurality of nodes.

In an exemplary embodiment, the converting device 390 is a device for converting a first model into a second model. As illustrated in FIG. 3, the converting device 390 may be present as a separate entity from the first computing device 310 and the second computing device 320, or also operate as a type included in the first computing device 310 and/or the second computing device 320.

In an exemplary embodiment, the benchmark result may include a result of executing (e.g., inferring) the artificial intelligence model in the target node. As an example, the benchmark result may include a performance measurement result when the artificial intelligence model is executed in the target node. As another example, the benchmark result may include a performance measurement result when the converted artificial intelligence model is executed in the target node.

In an exemplary embodiment, the benchmark result may be used as various types with various purposes. For example, the benchmark result may be used for determining the target node in which the prepared model is to be executed. For example, the benchmark result may be used for generating the candidate node list corresponding to the input model. For example, the benchmark result may be used for optimizing or compressing the prepared model. For example, the benchmark result may be used for deploying the prepared model in the target node.

Figures 4, 5:
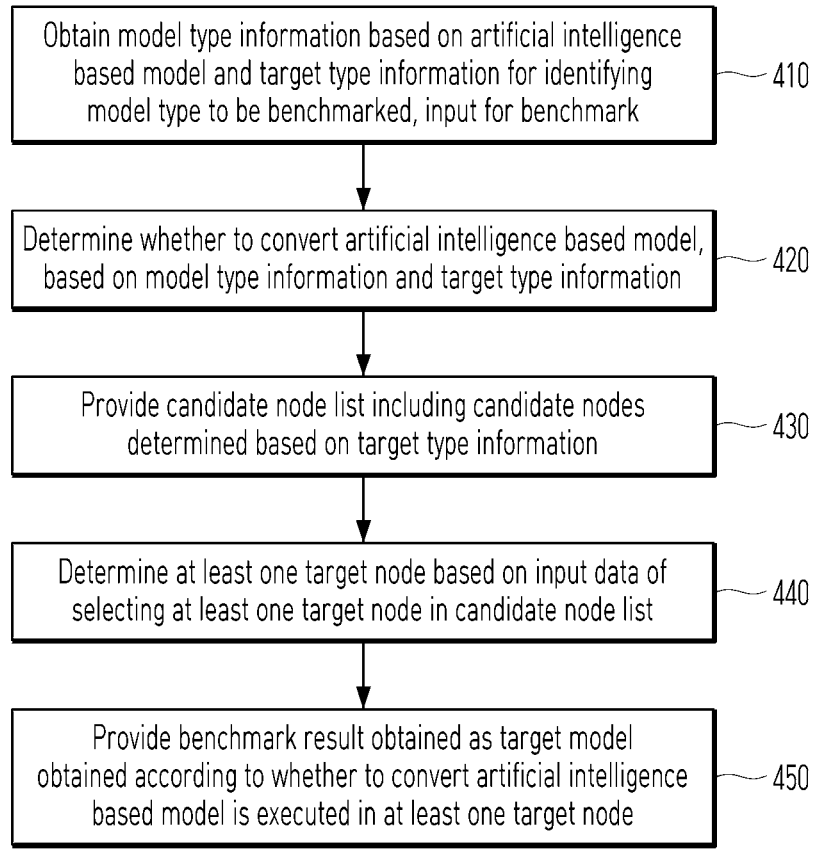
FIG. 4 illustratively illustrates a method for providing a benchmark result according to an exemplary embodiment of the present disclosure.
FIG. 5 illustratively illustrates a table type data structure used for generating a candidate node list according to an exemplary embodiment of the present disclosure.

FIG. 4 exemplarily illustrates a flowchart for providing a benchmark result according to an exemplary embodiment of the present disclosure.

In an exemplary embodiment, the method illustrated in FIG. 4 may be performed by the computing device 100. As an example, the method illustrated in FIG. 4 may be performed by the first computing device 310. As another example, the method illustrated in FIG. 4 may be performed by the computing device 100 that encompass the first computing device 310 and the second computing device 320.

Hereinbelow, an example in which steps of FIG. 4 are performed by the computing device 100 will be described in detail. It will be appreciated by those skilled in the art that some are omitted or additional steps may be included among the steps illustrated in FIG. 4 according to the implementation aspect.

In an exemplary embodiment, the computing device 100 may acquire model type information of the artificial intelligence based model input for the benchmark and target type information for identifying a model type which is subject to the benchmark (410).

The computing device 100 may receive input data including information related to a model which is to benchmark a specific model. For example, the input data may include information on a model file in which modeling is made and a model type to be benchmarked. As another example, the input data may include the model file in which modeling is made and model type information corresponding to the model file. As another example, the input data may include the model file in which modeling is made, the model type information corresponding to the model file, and information on a target type to be benchmarked. The computing device 100 may provide information for selecting a node in which the model is to be benchmarked in response to the input data.

In an exemplary embodiment, the model type information may include arbitrary type of information for identifying an input artificial intelligence based model. For example, the model type information may include information indicating an execution environment of the model, such as Tflite, Onnxruntime, and Tensorrt. For example, the model type information may also include library information or software version information for the execution environment of the model. In such an example, the model type information may be expressed as Python 3.7.3 and pillow 5.4.1 of Tflite.

In an exemplary embodiment, the target type information to be benchmarked may include arbitrary type of information for identifying the artificial intelligence based model for performing the benchmark.

In an additional exemplary embodiment, the computing device 100 may extract the model type information corresponding to the input artificial intelligence model. The computing device 100 parses the input artificial intelligence model (e.g., the model file) to acquire the execution environment and/or library information of the model. The computing device 100 compares the extracted model type information and the input target type information to determine whether to convert the model. In such an exemplary embodiment, the model type information of the input artificial intelligence based model may be determined from the input artificial intelligence based model without a user input for defining the model type information.

In an example, the target type information may be different from the model type information of the input artificial intelligence based model. In this case, the computing device 100 may acquire a converting result converted so that the input artificial intelligence based model may have the target type information. The target type information and the model type information of the input model being different may mean information on the execution environment of the model and/or the library information for the execution environment being different. As an example, converting may include replacing an operator included in the input model to correspond to the target type information. As an example, the converting may include changing the library information or software version of the input model to correspond to the target type information. As an example, the converting may include changing the execution environment of the input model to the execution environment corresponding to the target type information.

As another example, when the model type information of the input artificial intelligence based model and the target type information are the same as each other, the computing device 100 may generate the benchmark result for the input artificial intelligence based model without performing a converting operation.

In an exemplary embodiment, the computing device 100 may determine whether to convert the artificial intelligence based model based on the model type information and the target type information (420).

The computing device 100 compares the model type information of the input model and the target type information to determine whether to convert the artificial intelligence based model. The computing device 100 may judge whether the input artificial intelligence based model type information and the input target type information coincide with each other. When the input artificial intelligence based model type information and the input target type information do not coincide with each other, the computing device 100 may generate the benchmark result based on the converting result. When the input artificial intelligence based model type information and the input target type information coincide with each other, the computing device 100 executes the input artificial intelligence based model in the target node to generate the benchmark result.

In an exemplary embodiment, when the model type information and the target type information are different from each other, the computing device 100 may determine to convert the artificial intelligence based model to correspond to the target type information, and when the model type information and the target type information are the same, the computing device 100 may determine to use the artificial intelligence based model as the target model to be benchmarked without converting the artificial intelligence based model.

In an exemplary embodiment, whether to convert the artificial intelligence based model may be determined in response to inputting the model type information corresponding to the model and the target type information. As a result, estimated performance information for each the converted model (or operator) and each of the candidate nodes may be generated according to determination of whether to convert the artificial intelligence based model when generating or acquiring the candidate node list. In an exemplary embodiment, the estimated performance information may mean anticipated information related to a performance determined based on performance information for each model or operator for each of candidate nodes measured in the past. As an example, the estimated performance information may include estimated latency information.

In an additional exemplary embodiment, the computing device 100 may also determine whether to covert the model based on model related information (e.g., the model file, the model type information corresponding to the model file, and/or the target type information) and selected node information. For example, the computing device 100 may determine whether to convert the artificial intelligence based model based on whether the determined model is supported in the selected node or whether the operator included in the determined model is supported in the selected node. For example, the determined model may not be supported in the selected node. In this case, the computing device 100 may determine whether to convert the determined model or determine whether to convert at least some of the operators included in the determined model. As another example, when the determined model is not supported in the selected node, a first computing device 1000c may determine that converting the determined model is required or also determine to change the selected node to another node.

In an exemplary embodiment, the computing device 100 may provide the candidate node list including the candidate nodes determined based on the target type information (430).

In an exemplary embodiment, the candidate node may be used for determining the target node to be benchmarked of the model among the plurality of nodes. The target node to be benchmarked may be determined based on the input data among the candidate nodes included in the candidate node list.

According to an exemplary embodiment of the present disclosure, the candidate node may be determined by various schemes. In an exemplary embodiment, the candidate node may be determined based on a determination result for whether to convert the model, the artificial intelligence based model (or model type information), and the target type information.

For example, among nodes which are under the management of the computing device 100, nodes capable of supporting the input artificial intelligence based model may be determined as the candidate node. For example, among the nodes which are under the management of the computing device 100, nodes capable of supporting the execution environment corresponding to the target type information may be determined as the candidate node.

For example, among the nodes capable of supporting the execution environment corresponding to the target type information, first nodes having an execution environment for supporting a first operator included in the artificial intelligence based model may be determined as the candidate nodes. As an example, the computing device 100 may extract the operators included in the input artificial intelligence based model. When among nodes having a runtime matching the target type information, the runtime is matched but the extracted operator is not supported in a version of a runtime supported by the node, a node in which the version of the corresponding runtime is installed may be excluded from the candidate node.

For example, second nodes having an execution environment which does not support the first operator included in the artificial intelligence based model, but supports a second operator different from the first operator capable of replacing the first operator among the nodes having the execution environment corresponding to the target type information may be determined as the candidate nodes. As an example, when there is an operator capable of replacing the operator which is not supported, the computing device 100 may request replacement or change of the operator to the user, and when the replacement of the operator is requested from the user, the computing device 100 may make the corresponding node be included in the candidate node and otherwise, exclude the corresponding node from the candidate node.

For example, third nodes having a memory space which exceeds a size of the artificial intelligence based model may be determined as the candidate nodes.

The computing device 100 combines candidate node determination schemes described in various examples to generate the candidate node list.

In an exemplary embodiment, the computing device 100 may deliver the candidate node list to the computing device that requests the benchmark. The target node in which the benchmark is to be made may be determined according to user selection in the candidate node list.

In an exemplary embodiment, the candidate node list may include identification information for each of the candidate nodes and estimated latency information for each of the candidate nodes when the target model is executed.

In an exemplary embodiment, the estimated latency information may include an inference time anticipated for each model of each node. As a value of the estimated latency information is smaller, the inference time may be shorter. Accordingly, since a value of an estimated latency may be interpreted as a performance index for a combination of the artificial intelligence based model and the node, the computing device 100 may provide the candidate node list aligned based on a size of the estimated latency information. In such an example, the candidate node list may be provided in which the candidate nodes are aligned in an order in which the size of the latency information is smaller.

In an exemplary embodiment, identification information for the candidate node may include hardware information corresponding to the candidate node. For example, the identification information may include installed execution environment information, the library information for the execution environment, power mode information, fan mode information, current temperature information of a board, and/or current power usage information of the board in addition to a product name corresponding to hardware.

In an exemplary embodiment, the power mode information may be determined based on how many CPU cores are used. For example, when all of the CPU cores are used, the power mode information may be determined to be MAX and also determined by a scheme of quantitatively expressing the usage like 30 W, 20 W, 15 W, and 10 W. For example, as a quantitative amount of the power mode information is larger, the latency may decrease. As another example, when the power mode is MAX, the latency may decrease as compared with another node not using the power mode.

In an exemplary embodiment, the fan mode information may be expressed as a type of information indicating a strength of a fan like null, quiet, and cool. As an example, in a case where the fan mode is quiet, the temperature of the board may be lowered as compared with a case where the fan mode is null, so there is a high possibility that the latency will decrease. As an example, when the fan mode is the cool mode, the temperature of the board may be lowered as compared with another mode, so there is a high possibility that the latency will decrease.

In an exemplary embodiment, the library information may indicate library information required for installing execution environment (e.g., runtime) information installed in a specific node. A plurality of execution environments may be included according to the feature of the node, and as a result, the library information may also be compatible with the plurality of execution environments.

In an exemplary embodiment, the current power usage of the board may indicate a power usage acquired from a power measurement sensor connected to the nodes. It may be interpreted that a value of the current power usage of the board is smaller, a usability of the corresponding node increases.

In an exemplary embodiment, an alignment order of the candidate nodes included in the candidate node list may be determined based on the size of the estimated latency information. The computing device 100 may provide the candidate node list aligned based on the size of the estimated latency information. In such an example, the candidate node list may be provided in which the candidate nodes are aligned in an order in which the size of the latency information is smaller.

In an additional exemplary embodiment, the alignment order of the candidate nodes may be determined based on factors such as a memory usage and a CPU occupancy rate. For example, the alignment order of the candidate nodes may be determined additionally based on the memory usage and the CPU occupancy rate in addition to the estimated latency information. In such an example, when a difference in size of the estimated latency information between a first candidate node and a second candidate node among the candidate nodes is included in a predetermined threshold range, an alignment order between the first candidate node and the second candidate node may be determined based on the memory usages and the CPU occupancy rates of the first candidate node and the second candidate node. As an example, when the estimated latency is equal, additional alignment may be performed based on a current memory (e.g., RAM) usage and a current CPU occupancy rate.

In an additional exemplary embodiment, the computing device 100 may perform alignment by considering an additional factor in the case of a specific node such as Jetson series. For example, with respect to specific type of nodes such as the Jetson series, separate alignment for the corresponding nodes may be additionally conducted. As another example, when the specific type of nodes are aligned based on the estimated latency in the case of alignment of other type of nodes, and the nodes corresponding to the corresponding type have an estimated latency value within a similar range, the computing device 100 may perform alignment by additionally considering a Power field and/or a Fan field. As an example, the computing device 100 may perform alignment in an order in which the Power field is a lot by additionally considering a factor corresponding to the Power field. As an example, when the Power field is the same or is within a predetermined threshold range with respect to the specific node such as the Jetson series, the computing device 100 may perform additional alignment for nodes in an order in which an operation size of the fan is larger based on the size or a strength of the operation of the fan.

As described above, the alignment order of the candidate nodes may be determined by considering additional factors with respect to nodes having no large difference in the estimated latency information. In providing the candidate node list as such, since the candidate nodes are aligned in a form in which the user may intuitively confirm the estimated performance, the user may more easily and efficiently confirm the estimated performances of the nodes in the candidate node list, and more efficiently determine the target node.

In an exemplary embodiment, the computing device 100 may associate the converting operation in a process of generating the candidate node list.

For example, the computing device 100 may acquire a converted target model so that the artificial intelligence based model corresponds to the target type information. In an additional example, the computing device 100 may perform converting by the computing device 100 or acquire a target model changed to a target type through an external converting device. The computing device 100 may acquire sub latency information corresponding to each of the plurality of operators included in the target model. For example, one operator may correspond to one sub latency. Here, the sub latency information may be calculated for each of the candidate nodes. There may be the plurality of operators in the model, and the computing device 100 may measure or determine a sub latency generated when being executed in a specific target node for each operator. The computing device 100 may generate the estimated latency information of the target model for each of the candidate nodes based on the sub latency information of the plurality of operators. For example, the computing device 100 aggregates sub latencies corresponding to the operators included in the model, respectively to acquire the estimated latency information corresponding to the model. The computing device 100 may provide the candidate node list including the estimated latency information and the identification information of the candidate nodes.

In an exemplary embodiment, the plurality of operators may be included in the artificial intelligence based model. The operator may correspond to the operation of the artificial intelligence based model. Different operations in the model may be expressed as different operators. As an example, an operator corresponding to Conv2D representing a convolutional operation for a 2D image may be included in the model.

In an exemplary embodiment, the computing device 100 may also generate the candidate node list by using a latency table in which the plurality of operators and the nodes for each model match each other, respectively.

In an exemplary embodiment, the computing device 100 may acquire the estimated performance information for each of the candidate nodes by using the latency table without measuring the performance for each of the candidate nodes in the process of generating the candidate node list when there is the latency table. The computing device 100 may measure the performance for each of the candidate nodes and generate the candidate node list including the measured performance in the process of generating the candidate node list when there is no latency table.

As an example, one latency table may be acquired with respect to one model. In an exemplary embodiment, the latency table may include sub latency information acquired by executing each of the prestored operators in prestored nodes. Information on the operator may be included in one of a row and a column of the latency table, information on the node may be included in the other one node, and a value of an element may be expressed as the sub latency. After the latency table is initially generated through measurement in the computing device 100, the estimated performance of the candidate node list may be rapidly acquired by using a preliminarily prepared latency table without going through an additional measurement or execution procedure.

As described above, the computing device 100 may acquire the sub latency information corresponding to each of the plurality of operators included in the target model by using the preliminarily generated latency table, and generate the estimated latency information of the target model for each of the candidate nodes based on the sub latency information of the plurality of operators. The candidate node list including the estimated latency information and the identification information of the candidate nodes may be provided by such a scheme. The computing device 100 may determine the latency table corresponding to the input model, and generate the estimated latency information of the model for each of the candidate nodes based on the sub latency information for each of the nodes of the plurality of operators included in the determined latency table. The estimated latency information of the model may be generated by aggregating the sub latency information of the plurality of respective operators.

In an exemplary embodiment, the computing device 100 may generate the candidate node list by using a converting matching table.

In an exemplary embodiment, the computing device 100 may determine which type of (e.g., Type A) model is to be converted into which type of (e.g., Type B) model based on input information. When there is a converting history from Type A to Type B, there may be a separate converting matching table corresponding to converting from Type A to Type B. In this case, the computing device 100 may extract an operator in which the latency occurs only by analyzing the model corresponding to Type A, and calculate the estimated performance information based on a latency when the extracted operator is converted into Type B.

In an exemplary embodiment, when there is no history in which Type A is converted into Type B, the computing device 100 converts the model (or operator) corresponding to Type A into Type B, and then analyzes the converted model to extract the operator and calculates or measures the latency for the extracted operator to calculate the estimated performance information.

In an exemplary embodiment, the computing device 100 may preliminarily generate the converting matching table with respect to preliminarily determined converting types and/or converting types (or models) in which a time required for converting is required for a predetermined threshold time or more.

In an exemplary embodiment, the converting matching table may include sub latency information corresponding to the converted operator when the operator extracted from the artificial intelligence based model corresponding to the model type information is converted to correspond to the target type information. For example, one of the row and one of column of the converting matching table may include operators corresponding to the model type information before converting, the other one may include operators corresponding to the target type information after converting, and the element in the converting matching table may include sub latency information corresponding to the converted operator when the operator is converted. In an example, the converting matching table may be generated for each node. In such an example, one converting matching table may correspond to one node. In an example, the converting matching table may be generated for each node and for each combination of the models. In such an example, the sub latency information for each operator in the first node of the second model converted from the first model may be expressed as one table.

In an additional exemplary embodiment, the computing device 100 may use a converting matching table including conversion information between operators in which a specific operator of a specific model is converted into another operator of another model. In such an example, the converting matching table may include information indicating how the operators are converted in the model when the conversion between the models occurs. As an example, one of the row and the column in the converting matching table may include operators of the model before converting, and the other one may include operators of the model after converting. By using the converting matching table, it may be confirmed how the operators are changed according to converting. In such an exemplary embodiment, the computing device 100 may identify the operators of the converted model by using the converting matching table, and acquire the sub latency for each node for each of the operators of the converted model by using the latency table. The estimated performance information for each node for the converted model may be acquired through aggregation of the sub latencies.

In an exemplary embodiment, the computing device 100 may determine whether there is the converting matching table for matching the model type information and the target type information when it is determined that the artificial intelligence based model is to be converted, and generate the estimated latency information of the target model for each of the candidate nodes based on the operator included in the artificial intelligence based model and the candidate matching table when there is the converting matching table. The computing device 100 may provide the candidate node list including the estimated latency information and the identification information of the candidate nodes.

In an exemplary embodiment, the computing device 100 combines the latency table and the converting matching table to determine the sub latency for each of the operators of the converted model, and aggregates the determined sub latencies to generate the estimated latency information for the converted model.

In an additional exemplary embodiment, the computing device 100 may also generate the estimated latency information of the target model for each of the candidate nodes by combining a latency table including a latency measurement result for each node not by the unit of the operator but by the unit of the model and/or a converting matching table including a latency measurement result according to converting for each node not by the unit of the operator but by the unit of the model.

In an exemplary embodiment of the present disclosure, the computing device 100 may determine whether the converting is to be performed based on a comparison between the model type information corresponding to the input model and the input target type information. When it is determined that the converting is to be performed, the computing device 100 extracts the operators included in the input model to determine the candidate node to be included in the candidate node list among the nodes having the execution environment matching the target type information.

In an exemplary embodiment, when a specific node has the execution environment matching the target type information, but does not support the operator included in the input model in the execution environment, the computing device 100 may determine the specific node in which the execution environment is installed not to be included in the candidate node list. For example, when the runtime for supporting the operator in the corresponding node matches the operator included in the input model, but the operator included in the input model is not supported in a runtime version of the corresponding node, the node in which the corresponding runtime version is installed may be excluded from the candidate node.

In an exemplary embodiment, when the specific node does not support the operator included in the input model in the corresponding execution environment, but there is an operator capable of replacing the corresponding operator, the computing device 100 may deliver a request for determining whether to replace the operator. When an input for desiring the replacement of the operator is received from the user, the specific node may be included in the candidate node list, and when an input for not desiring the replacement of the operator is received from the user, the specific node may not be included in the candidate node list. For example, when the runtime in which the operator is supported in the corresponding node matches the operator included in the input model, but the operator included in the input model is not supported in the runtime version of the corresponding node, when the operator capable of replacing the corresponding operator is supported in the runtime version of the corresponding node, the candidate node may be determined through a replacement request for the operator. When a replacement input for the operator is received, the corresponding node may be determined as the candidate node, and otherwise, the corresponding node may be excluded from the candidate node.

In an exemplary embodiment, the candidate node list may include, for example, a table type data structure.

In an exemplary embodiment, the computing device 100 may determine at least one target node based on input data for selecting at least one target node in the candidate node list (440).

In an exemplary embodiment, the computing device 100 may receive user input data for selecting a specific node in the candidate node list. The computing device 100 may determine selected nodes included in the user input data as the target node.

In an exemplary embodiment, the computing device 100 may receive user input data for selecting at least one target node in the candidate node list. In another exemplary embodiment, the computing device 100 may receive user input data for selecting a plurality of target nodes in the candidate node list. In another exemplary embodiment, the computing device 100 may also automatically select a node having a highest performance as the target node without the user input based on a specific factor (e.g., latency) in the candidate node list.

In an exemplary embodiment, the computing device 100 may provide the benchmark result acquired as the target model acquired according to whether to convert the artificial intelligence based model is executed in at least one target node (450).

In an exemplary embodiment, the computing device 100 may generate a benchmark result including a result of inferring the target model in the target node.

In an exemplary embodiment, when one node is determined as the target node, benchmark request information may be transmitted to the corresponding node. In an exemplary embodiment, when a plurality of nodes is determined as the target node, the benchmark request information may be transmitted to each of the plurality of nodes. The benchmark request information may include information on the target model to be benchmarked. Information on the target model may include, for example, a file or a link related to the model and/or target type information of the model.

In an exemplary embodiment, the benchmark result may be generated by the computing device 100 or performed by another server (e.g., a server including the plurality of nodes) under the management of the computing device 100.

In an exemplary embodiment, the benchmark result may include performance information in the target node of the target model.

In an exemplary embodiment, the benchmark result may be different according to what a module of another computing device triggering or requesting the benchmark operation of the computing device 100 is. In an additional exemplary embodiment, the benchmark operation may be different according to what the module of another computing device triggering or requesting the benchmark operation of the computing device 100 is. For example, when the module triggering the benchmark operation of the computing device 100 is the first module, the computing device 100 may provide performance information for all input models, and when the module triggering the benchmark operation of the computing device 100 is the second module, the computing device 100 may additionally provide block-unit performance information of the input model jointly with providing the performance information for all of the input models. As another example, when the module triggering the benchmark operation of the computing device 100 is the first module, the computing device 100 may provide a benchmark result for determining a target node which is to execute the learning model corresponding to the input dataset or the converted learning model, and when the module triggering the benchmark operation of the computing device 100 is the second module, the computing device 100 may provide a benchmark result including the configuration data used for generating the compressed model corresponding to the input model.

As a non-limiting example, a plurality of modules triggering the benchmark operation of the computing device 100 may include a first module generating the learning model based on the input dataset, a second module generating the compressed model by compressing the input model, and a third module generating the download data for deploying the input model in at least one target node.

In an exemplary embodiment, the benchmark request information may include information on whether to convert the model. The converting for the input model may be performed based on whether to convert the model, which is included in the benchmark request information.

In an exemplary embodiment, when the computing device 100 determines to convert the artificial intelligence based model to correspond to the target type information, the computing device 100 may determine a specific converter among a plurality of converters by using information related to the input model. For example, the computing device 100 may determine converter identification information corresponding to the combination of the model type information of the input model and the target type information. A converter corresponding to the determined converting identification information may be determined, and the converting operation may be performed by the determined converter. For example, the computing device 100 may acquire a target model into which the artificial intelligence based model is converted by using the model file corresponding to the artificial intelligence based model and the converter identification information corresponding to the combination of the model type information and the target type information. As described above, when it is determined that the converting is performed, the converting may be performed by using a model file to be converted and information (e.g., an identifier for identifying a combination of a model type before converting and a model type after converting) for identifying a converter which is to perform the converting. As an example, the converting may be performed by a converting device (e.g., a converting server).

As another example, according to the implementation aspect, the converting may also be performed by the computing device 100. In such an example, when a model file according to a result of a project is a corresponding execution environment of another type (e.g., onnxruntime) other than an execution environment corresponding to a specific type (e.g., tensorrt), the computing device 100 may convert another type (e.g., onnxruntime) of model into the specific type (e.g., tensorrt) of model by using a converting function, and provide the model file according to the converting result.

In an exemplary embodiment, the artificial intelligence based model may be converted into the target model by using a docker image of the converter corresponding to the converter identification information on a virtual operating system. For example, an entity (e.g., the converting server) performing the converting acquires a docker image corresponding to the input converter identification information, and executes an sh file of the converter in a docker to convert the model. Here, the sh file may represent a file including instructions to be executed in the docker.

In an exemplary embodiment, the benchmark result may include first type of quantitative information related to the time and second type of quantitative information related to the memory usage.

In an exemplary embodiment, the benchmark result acquired as the target model is executed in at least one target node may include preprocessing time information required for preprocessing of inference of the target model in at least one target node, inference time information required for inferring the target model in at least one target node, preprocessing memory usage information used for preprocessing the inference of the target model in at least one target node, inference memory usage information used for inference of the target model in at least one target node, inference time related quantitative information acquired as the target model is inferred repeatedly at a predetermined number of times in at least one target node, and/or quantitative information related to the memory usage for each of an NPU, a CPU, and a GPU acquired as the target model is inferred in at least one target node.

In an exemplary embodiment, the preprocessing time information may include, for example, time information required for preprocessing before an inference operation is performed such as calling the model. Additionally, the preprocessing time information may also include quantitative information (e.g., a minimum value, a maximum value, and/or an average value of a time required for prior inference) related to a time required for prior inference when the prior inference is repeated at a predetermined number of times for activation of a GPU before measuring a value for inference.

In an exemplary embodiment, the inference time information as time information required in an inference process may be used to encompass, for example, minimum time information, maximum time information, average time information, and/or median time information among the time information required for an initial inference operation for the model and/or inference time information when inference is repeated at a predetermined number of times. Additionally, for example, in a situation in which an operation which may not be processed in the NPU is received and processed by the CPU, the NPU becomes in an idle state, and the inference time information may include a first cycle value when the NPU becomes in the idle state. Additionally, the inference time information may also include a second cycle value when the inference is performed by the NPU and/or a third cycle value acquired by aggregating the first cycle value and the second cycle value.

In an exemplary embodiment, the benchmark result information may also include total time information acquired by aggregating the preprocessing memory usage information and the quantitative information related to the inference time.

In an exemplary embodiment, the benchmark result information may additionally include an RAM usage, a ROM usage, a total memory usage, and/or a quantitative value for an SRAM area used by the NPU.

In an exemplary embodiment, when a plurality of benchmark results is generated as multiple nodes are selected as the target node, the computing device 100 may align the plurality of benchmark results based on the latency. For example, the benchmark results may be aligned and output in an order in which the latency is smallest. In an additional exemplary embodiment, when the latency is within a predetermined similar range or there is a benchmark result corresponding to each of a plurality of same nodes, the benchmark results may be aligned additionally based on the memory usage and/or the CPU occupancy rate. The alignment for the benchmark results may include a feature related to the alignment in the candidate node list.

In an exemplary embodiment, the benchmark result may include, for example, the table type data structure.

In an exemplary embodiment, the computing device 100 may transmit the benchmark request information according to whether wireless communication of a plurality of connected nodes is enabled by a different scheme. The wireless communication may include, for example, HTTP communication. For example, when the benchmark request is delivered to an independent node in which the wireless communication is enabled, the computing device 100 may transmit the benchmark request information to the corresponding node or a server related to the corresponding node. For example, when intending to deliver the benchmark request to a node incapable of wireless communication, the computing device 100 may transmit the benchmark request information to a node (e.g., Rpi4) capable of wireless communication, to which the node in which the node incapable of wireless communication is connected through USB/GPIO. The corresponding node (e.g., a node capable of HTTP communication) receiving the benchmark request information may acquire the benchmark result by a scheme of executing a program in a node (e.g., a node incapable of HTTP communication) to be benchmarked, which is connected by using serial communication through USB/GPIO connection. An estimated usage memory may be measured by a scheme of executing an execution environment corresponding to a target model type to be executed in the independent node capable of wireless communication. A benchmark program to be driven in the node incapable of wireless communication, which is to be benchmarked may be made and compiled by using the measured e usage memory and the benchmark request information. The made and compiled program may be flashed to the node incapable of wireless communication, which is to be benchmarked through the serial communication. The benchmark result in the node incapable of wireless communication may be acquired by such a scheme.

In an exemplary embodiment, the computing device 100 may acquire the benchmark result through the following method when a node (e.g., a virtual node) which is impossible to be identifiable from the outside is included in the target node.

The computing device 100 may transmit, to the node, a first acknowledgment message including a benchmark task for benchmarking the target model in the node in response to reception of a first low-power wireless signal from the node which is impossible to be identifiable from the outside. For example, the first low-power wireless signal may include a beacon signal. For example, the first low-power wireless signal may include whether the node performing the benchmark, the memory usage of the node, and hardware identification information of the node.

The computing device 100 may receive, from the node, a second low-power wireless signal (e.g., a callback signal) including the benchmark result generated by the node. In an additional exemplary embodiment, the computing device 100 may determine that the benchmark task in the node is unsuccessful and set the node in an inactive state when the callback signal is not received for a predetermined threshold waiting time. The computing device 100 may set the state of the node to an active state in response to reception of a third low-power wireless signal (e.g., the beacon signal) from the node which is set in the inactive state. Here, the benchmark task included in the first acknowledge message may include target model information which may be downloaded to the node and node configuration information used for converting the target model, which may be downloaded to the node. Further, the benchmark result generated by the node may include a result acquired as the target model is executed in the execution environment of the node based on the node configuration information and the target model information.

FIG. 5 illustratively illustrates a table type data structure 500 used for generating a candidate node list according to an exemplary embodiment of the present disclosure.

The data structure 500 in FIG. 5 is illustrated for the purpose of description, and a data structure to which the number of nodes, the number of operators, the type of performance information, and/or the number of models are variously applied according to the implementation aspect may also be included in the scope of the present disclosure.

In the data structure 500 illustrated in FIG. 5, the plurality of operators and nodes for each model may match each other, respectively. A row (or column) 510 in the data structure 500 indicates identification information for the node and a column (or row) 520 indicates identification information for an operator included in a specific model.

In an exemplary embodiment, values of elements included in the data structure 500 may indicate performance information when a specific operator of a specific model is executed (e.g., inferred) in a specific node. For example, as illustrated in FIG. 5, the performance information may include information related to the latency. Here, the performance information indicate operator-specific performance information, as an example. As an example, here, the performance information may indicate sub latency information in FIG. 4.

In the example in FIG. 5, it may be interpreted that as the value of the element is smaller (e.g., the latency value is smaller), the performance is excellent. For example, the first operator may have an excellent performance in the order of the third node, the first node, the second node, and the fourth node.

In an exemplary embodiment, the computing device 100 may generate estimated performance information for the combination between the model and the node required for generating the candidate node list by using one or more data structures 500. The data structure 500 may further include a value acquired by aggregating the performance information of the operators for each node. In such an exemplary embodiment, the first node may have estimated performance information of 3 ms+4 ms+5 ms+7 ms=19 ms, the second node may have estimated performance information of 34 ms, the third node may have estimated performance information of 22 ms, and the fourth node may have estimated performance information of 32 ms with respect to the specific model. For example, the nodes may be aligned in an order in which the performance is more excellent in the candidate node list. In such an example, in the candidate node list, the candidate nodes may be aligned in the order of the first node, the third node, the fourth node, and the second node.

In an exemplary embodiment, the data structure 500 may be generated for each model. In such an exemplary embodiment, one model may correspond to one data structure 500, but according to the implementation aspect, one data structure 500 corresponding to a plurality of models may also be generated.

In an exemplary embodiment, the data structure 500 may correspond to a latency table in which the plurality of operators and nodes for each model match each other, respectively. The computing device 100 may generate the candidate node list by using the latency table.

In an exemplary embodiment, the latency table may include sub latency information acquired by executing each of prestored operators in prestored nodes. Information on the operator may be included in one of a row and a column of the latency table, information on the node may be included in the other one node, and a value of an element may be expressed as the sub latency. After the latency table is initially generated through measurement in the computing device 100, the candidate node list may be rapidly generated or acquired by using a preliminarily generated latency table in response to a user input without going through an additional measurement or execution procedure.

As described above, the computing device 100 may acquire the sub latency information corresponding to each of the plurality of operators included in the target model by using the preliminarily generated latency table, and generate the estimated latency information of the target model for each of the candidate nodes based on the sub latency information of the plurality of operators. The computing device 100 may determine the latency table corresponding to the input model, and generate the estimated latency information of the model for each of the candidate nodes based on the sub latency information for each of the nodes of the plurality of operators included in the determined latency table. The estimated latency information of the model may be generated by aggregating the sub latency information of the plurality of respective operators.

In an exemplary embodiment, the data structure 500 may be updated by the computing device 100 a change event related to the update of the model, addition of a new node, and/or addition of a new model. When there is no change event, the data structure 500 may be utilized to generate the candidate node list in response to the user input without separate execution or measurement by the computing device 100.

FIG. 6 illustratively illustrates a table type data structure 600 used for generating a candidate node list according to an exemplary embodiment of the present disclosure.

The data structure 600 in FIG. 6 is a table type data structure 600 representing source operators 620 of a model (e.g., a source model) before converting and target operators 610 of a model (e.g., a target model) after converting when the model is converted. Values of the elements of the data structure 600 may represent an estimated performance (e.g., a sub latency) for a specific node in the target operator when the source operator 620 is converted into the target operator 610.

In an exemplary embodiment, the data structure 600 may be generated for each combination of the models and for each node. For example, one data structure 600 may cover a case where the first model is converted into the second model, and the converted second model is executed in the first target node. In such an example, the case where the second model is converted into the first model may be covered through another data structure. According to the implementation aspect, a range covered by one data structure 600 may be variable, and for example, one data structure 600 may also include sub latencies of the converted operators in the plurality of nodes.

In another example, the data structure 600 may be generated for each node. That is, when the source model is converted into the target model, it may be determined which source operators in the source model are to be changed to which target operators in the target model. In this case, the computing device 100 acquires sub latency information between the source operators and the target operators related to converting by referring to the data structure 600 to thereby acquire the estimated performance information related to the converted target model or the converted target operator.

In an exemplary embodiment, the data structure 600 may correspond to the converting matching table. The computing device 100 may determine whether there is the converting matching table when it is determined that the artificial intelligence based model is to be converted, and generate the estimated latency information of the target model for each of the candidate nodes based on the operator included in the artificial intelligence based model and the converting matching table when there is the converting matching table. The computing device 100 may provide the candidate node list including the estimated latency information and the identification information of the candidate nodes.

In an exemplary embodiment, the converting matching table may include sub latency information corresponding to the converted operator when the operator extracted from the artificial intelligence based model corresponding to the model type information is converted to correspond to the target type information. The converting matching table is a table type data structure 600 summarizing which performance the converted operator has in the specific node when converting between the operators occurs. For example, one 620 of the row and the column of the converting matching table may include operators corresponding to the model type information before converting, the other one 610 may include operators corresponding to the target type information after converting, and the element in the converting matching table may include sub latency information corresponding to the converted operator when the operator is converted.

In an example, the converting matching table may be generated for each node. In such an example, one converting matching table may correspond to one node. In an example, the converting matching table may be generated for each node and for each combination of the models (or operators). In such an example, the sub latency information for each operator in the first node of the second model converted from the first model may be expressed as one table. In such an example, the source operators 620 may include operators in which there is a change in a converting process to the target model among all operators included in the source model.

In an exemplary embodiment, the data structure 600 may be updated by the computing device 100 a change event related to the update of the model, addition of a new node, and/or addition of a new model. When there is no change event, the data structure 600 may be utilized to generate the candidate node list in response to the user input without separate execution or measurement by the computing device 100.

FIG. 7 illustratively illustrates a table type data structure used for generating a candidate node list according to an exemplary embodiment of the present disclosure.

In an exemplary embodiment, the data structure 700 may represent a conversion relationship between the operators of the model before covering and the operators of the model after converting. A column 720 in FIG. 7 represents operators to be converted in the first model corresponding to the model before converting. A row 710 in FIG. 7 represents converted operators included in respective models after converting.

For example, a 1-1st operator of the model before converting in the data structure 700 is not changed (as the 1-1st operator) when being converted into the second model, is changed to a 1-3rd operator when being converted into the third model, is changed to the 1-3rd operator when being converted into the fourth model, and not changed (as the 1-1st operator) when being converted into the fifth model.

In an exemplary embodiment, the data structure 700 may be used jointly with the data structure 500 and/or the data structure 600 when generating the candidate node list. For example, the computing device 100 compares the model type information of the input model and the input target type information to determine whether to convert the input model. When it is determined that the converting is required, the computing device 100 may identify the model before converting and the model after converting, and determine the data structure 700 corresponding to the identified models. Based on the determined data structure 700, the computing device 100 may confirm which operators of the models before converting are changed to which operators in the model after converting. The computing device 100 may determine which performance (e.g., sub latency) the changed operators have with respect to the specific node by using the data structure 500 and/or the data structure 600. By such a scheme, the computing device 100 may generate the candidate node list.

In an exemplary embodiment, the computing device 100 may use a converting matching table including conversion information between operators in which a specific operator of a specific model is converted into another operator of another model. The data structure 700 may correspond to the converting matching table. In such an example, the converting matching table may include information indicating how the operators are converted in the model when the conversion between the models occurs. As an example, one 720 of the row and the column in the converting matching table may include operators of the model before converting, and the other one 710 may include operators of the model after converting. By using the converting matching table, it may be confirmed how the operators are changed according to converting. In such an exemplary embodiment, the computing device 100 may identify the operators of the converted model by using the converting matching table, and acquire the sub latency for each node for each of the operators of the converted model by using the latency table. The estimated performance information for each node for the converted model may be acquired through aggregation of the sub latencies.

Figure 8:
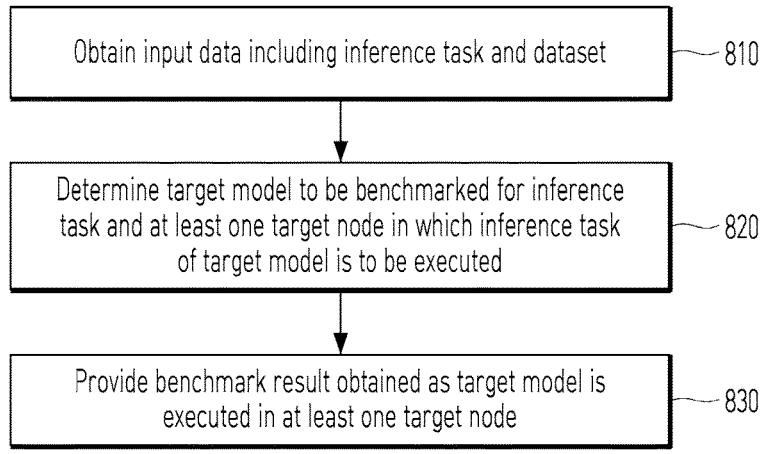
FIG. 8 illustratively illustrates a method for providing a benchmark result according to an exemplary embodiment of the present disclosure.

FIG. 8 illustratively illustrates a method for providing a benchmark result according to an exemplary embodiment of the present disclosure.

In an exemplary embodiment, the method illustrated in FIG. 8 may be performed by the computing device 100. As an example, the method illustrated in FIG. 8 may be performed by the first computing device 310. As another example, the method illustrated in FIG. 8 may be performed by the computing device 100 that encompass the first computing device 310 and the second computing device 320.

Hereinbelow, an example in which steps of FIG. 8 are performed by the computing device 100 will be described in detail. It will be appreciated by those skilled in the art that some of the steps illustrated in FIG. 8 are omitted or additional steps may be included according to the implementation aspect.

In an exemplary embodiment, the computing device 100 may acquire input data including an inference task and a dataset (810).

In an exemplary embodiment, the computing device 100 may receive input data including the inference task including the type and/or the purpose of inference of the artificial intelligence based model, and a dataset for learning, verifying, and/or testing the artificial intelligence based model. For example, the inference task may include various types of purposes to be achieved through the inference of the artificial intelligence model, such as object classification, object detection, object segmentation, clustering, sequence prediction, sequence determination, anomaly detection, and/or natural language processing. For example, the dataset may include learning data used for learning the artificial intelligence based model, verification data for evaluating the learning performance in the learning process of the artificial intelligence based model, and/or test data for evaluating the performance of the artificial intelligence based model of which learning is completed.

In an additional exemplary embodiment, the computing device 100 may also receive information (e.g., the model file) on the artificial intelligence based model of which learning is completed.

In an additional exemplary embodiment, the computing device 100 may also receive the information on the artificial intelligence based model and the target type information which is a model type to be benchmarked. Here, the information on the artificial intelligence based model may include the model file, a link for downloading the model file, and/or the model type information corresponding to the model.

In an additional exemplary embodiment, the computing device 100 may generate the dataset when the dataset is not provided. For example, the computing device 100 may randomly generate the dataset. For example, the computing device 100 may generate the dataset based on information related to a task input by the user. For example, the computing device 100 may generate the dataset for performing modeling by using a generation model such as GAN and/r a diffusion model.

In an exemplary embodiment, the computing device 100 may determine a target model to be benchmarked for the inference task and at least one target node in which the inference task of the target model is to be executed (820).

In an exemplary embodiment, the computing device 100 provides a candidate node list including candidate nodes recommended for the benchmark for the inference task, and receives input data for selecting at least one target node in the candidate node list to determine the target node in which the inference task is to be executed.

In an exemplary embodiment, the candidate node may be used as a meaning that encompasses a node which is ready for performing the benchmark and/or a node that may support the target model. In an exemplary embodiment, the candidate node list may include, for example, a table type data structure.

In an exemplary embodiment, the candidate node may be used for determining the target node to be benchmarked of the model among the plurality of nodes. The target node to be benchmarked may be determined based on the input data among the candidate nodes included in the candidate node list. In such an exemplary embodiment, the candidate node may correspond to the node that may support the target model, for example.

In an exemplary embodiment, the candidate node list may be used for determining the target node to be benchmarked and the target model to be benchmarked among the plurality of nodes. For example, the candidate node list may include candidate nodes which are ready for performing the benchmark task (e.g., in a standby state) among the plurality of nodes. In such an exemplary embodiment, the candidate node may correspond to a node which is ready for performing the benchmark. The target node which is to be benchmarked may be determined according to the user input for selecting the node to be benchmarked in the candidate node list. In the above-described example, when the target node is determined based on the input data in the candidate node list, information related to the target model having the execution environment (e.g., the runtime) which may be supported by the determined target node may be provided. Here, the information related to the target model may include identification information for a plurality of models which may be supported by the determined target node. As an example, when the target node is determined according to the user input in the candidate node list, recommendation information for the target model which is enabled to be supported by the target node may be generated. The recommendation information may include information related to one or more target models. The target model may be determined in response to the user input in the recommendation information. Here, the target model may include first information of the target model representing a framework of the target model and second information of the target model representing a software version of the target model. In an exemplary embodiment, information on a target model which is enabled to be supported by at least one target node, which is included in the input data in the candidate node list may be automatically provided without a separate user input. In an exemplary embodiment, the user may select the framework of a desired target model and the software version of the desired target model in the recommendation information for the target model. As described above, the computing device 100 automatically provides the recommendation information of the target models which may be supported by the target node in response to a selection input for the target node to enable the models corresponding to the node to be benchmarked to be easily selected even though the user does not hold a rich knowledge of an artificial intelligence field. For example, the computing device 100 determines the at least one target node and information for recommending a target model supportable by the at least one target node to determine the target model, in response to receiving second input data selecting the at least one target node in the candidate node list. For example, the information for recommending the target model comprises, identification information corresponding to a recommended target model, and software version information of a recommended target model.

In an exemplary embodiment, the computing device 100 may provide the candidate node list including the candidate nodes recommended for the benchmark for the inference task. For example, the candidate node list may include identification information for each of the candidate nodes and estimated latency information for each of the candidate nodes when the target model is executed. As an example, an arrangement order of the candidate nodes included in the candidate node list may be determined based on the size of the estimated latency information. In the case where the estimated latency is small, a relatively short time may be required when the inference is performed in the corresponding node, so the computing device 100 may provide the candidate node list in the order in which the size of the estimated latency is smaller (e.g., in the order in which the performance is more excellent). As a result, the user may intuitively confirm the estimated performance of each of the candidate nodes, and select the target node in the candidate node list by a more efficient scheme.

In an exemplary embodiment, the arrangement order in the candidate node list may be determined by considering various factors.

In an exemplary embodiment, the arrangement order in the candidate node list may be determined based on the size of the estimated latency. As an example, the candidate nodes may be aligned in the order in which the size of the estimated latency is smaller.

In an exemplary embodiment, the arrangement order in the candidate node list may be determined based on the size of the CPU occupancy rate. As an example, the candidate nodes may be aligned in the order in which the size of the CPU occupancy rate is smaller. When a current CPU occupancy rate is high, a hardware resource when performing the benchmark related to the inference may be limited, the candidate nodes in the candidate node list may be aligned in the order in which the CPU occupancy rate is lower.

In an exemplary embodiment, the arrangement order in the candidate node list may be determined based on the size of the memory usage. As an example, the candidate nodes may be aligned in the order in which the size of the memory usage is smaller. When a current memory usage is large, the hardware resource when performing the benchmark related to the inference may be limited, the candidate nodes in the candidate node list may be aligned in the order in which the memory usage is smaller.

In an exemplary embodiment, the arrangement order of the candidate nodes in the candidate node list may be determined based on a priority for a plurality of factors. For example, the priority for the estimated latency may be higher than the priority for the CPU occupancy rate and/or the memory usage. In such an example, when a difference in size of the estimated latency information between a first candidate node and a second candidate node among the candidate nodes is included in a predetermined threshold range or when the size of the estimated latency information is equal, the alignment order between the first candidate node and the second candidate node may be determined based on the memory usages and/or the CPU occupancy rates of the first candidate node and the second candidate node. In such an example, candidate nodes in which the size of the estimated latency belongs to a similar range may be aligned in the order in which the memory usage and/or the CPU occupancy rate are/is smaller.

In an exemplary embodiment, the candidate node list may include performance information which may help the user determine the target node in addition to the identification information of each of the candidate nodes in the candidate node list. For example, the candidate node list may include power mode information representing a usage of a CPU core for at least some nodes among the candidate nodes and/or fan mode information representing a fan usage for at least some nodes among the candidate nodes. For example, the candidate node list may include information on at least one model which is enabled to be supported by each of the candidate nodes, library information required for installing at least one model which is enabled to be supported by each of the candidate nodes, and/or power usage information representing a power usage acquired by a power measurement sensor connected to the candidate nodes.

In an exemplary embodiment, the identification information for the candidate node may include hardware information capable of identifying the candidate node. For example, the identification information may include installed execution environment information, library information for the execution environment, power mode information, fan mode information, temperature information of a current board, and/or power usage information of the current board in addition to a product name corresponding to hardware.

In an exemplary embodiment, the power mode information may be determined based on how many CPU cores are used. For example, when all of the CPU cores are used, the power mode information may be determined to be MAX and also determined by a scheme of quantitatively expressing the usage of the power like 40 W, 30 W, 20 W, and 10 W. For example, as a quantitative amount of the power mode information is larger, the latency may decrease. As another example, when the power mode is MAX, the latency may decrease as compared with another node not using the power mode.

In an exemplary embodiment, the fan mode information may be expressed as a type of information indicating a strength of a fan like null, quiet, cool and/or max. As an example, in a case where the fan mode is quiet, the temperature of the board may be lowered as compared with a case where the fan mode is null, so there is a high possibility that the latency will decrease. As an example, when the fan mode is the cool mode, the temperature of the board may be lowered as compared with another mode, so there is a high possibility that the latency will decrease.

In an exemplary embodiment, the library information may indicate library information required for installing execution environment (e.g., runtime) information installed in a specific node. A plurality of execution environments may be included according to the feature of the node, and as a result, the library information may also be compatible with the plurality of execution environments.

In an exemplary embodiment, the current power usage of the board may indicate a power usage acquired from a power measurement sensor connected to the nodes. It may be interpreted that a value of the current power usage of the board is smaller, a usability of the corresponding node increases.

In an exemplary embodiment, there may be various methodologies for determining the candidate node included in the candidate node list. A candidate node determination scheme according to an exemplary embodiment of the present disclosure may be implemented through an arbitrary type of combination of various methodologies below.

For example, the computing device 100 may not perform the current benchmark or may determine a list of nodes which are ready for performing the current benchmark as the candidate node.

For example, the computing device 100 may determine nodes which may support the determined target model (or the determined target model information) as the candidate node. Among nodes which are under the management of the computing device 100, nodes capable of supporting the input artificial intelligence based model may be determined as the candidate node.

For example, among the nodes capable of supporting the execution environment corresponding to the target type information, the computing device 100 may determine first nodes having the execution environment for supporting the first operator included in the artificial intelligence based model as the candidate nodes.

For example, the computing device 100 may determine second nodes having an execution environment which does not support a first operator included in the artificial intelligence based model, but supports a second operator different from the first operator, which is capable of replacing the first operator among the nodes having the execution environment corresponding to the target type information as candidate nodes.

For example, the computing device 100 may determine nodes having a memory space which exceeds the size of the artificial intelligence based model as the candidate nodes.

In an exemplary embodiment, the computing device 100 may perform alignment for the corresponding node by considering an additional factor when a specific node (e.g., Jetson-series hardware) is included in the candidate node list. For example, separate alignment for corresponding nodes may be additionally conducted in a form in which specific types of nodes such as Jetson series are distinguished from other types of nodes. As another example, when the specific type of nodes are aligned based on the estimated latency in the case of alignment of other type of nodes, and the nodes corresponding to the corresponding type have an estimated latency value within a similar range, the computing device 100 may perform alignment by additionally considering a Power field and/or a Fan field. As an example, the computing device 100 may perform alignment in an order in which the Power field is a lot by additionally considering a factor corresponding to the Power field. As an example, when the Power field is the same or is within a predetermined threshold range with respect to the specific node such as the Jetson series, the computing device 100 may perform additional alignment for nodes in an order in which an operation size of the fan is larger based on the size or a strength of the operation of the fan.

In an exemplary embodiment, the computing device 100 may receive user input data for selecting a specific node in the candidate node list. The computing device 100 may determine selected nodes included in the user input data as the target node.

In an exemplary embodiment, the computing device 100 may receive user input data for selecting at least one target node in the candidate node list. In another exemplary embodiment, the computing device 100 may receive user input data for selecting a plurality of target nodes in the candidate node list. In another exemplary embodiment, the computing device 100 may also automatically select a node having a highest performance as the target node without the user input based on a specific factor (e.g., latency) in the candidate node list.

In an exemplary embodiment, the computing device 100 may provide the benchmark result acquired as the target model is executed in at least one target node (830).

In an exemplary embodiment, the computing device 100 may generate a benchmark result including a result of inferring the target model in the target node.

In an exemplary embodiment, when one node is determined as the target node, benchmark request information may be transmitted to the corresponding node. In an exemplary embodiment, when a plurality of nodes is determined as the target node, the benchmark request information may be transmitted to each of the plurality of nodes. The benchmark request information may include information on the target model to be benchmarked. Information on the target model may include, for example, a file or a link related to the model and/or target type information of the model.

In an exemplary embodiment, the benchmark result may be generated by the computing device 100 or performed by another server (e.g., a server including the plurality of nodes) under the management of the computing device 100.

In an exemplary embodiment, the benchmark result may include performance information in the target node of the target model.

In an exemplary embodiment, the benchmark result may be different according to what a module of another computing device triggering or requesting the benchmark operation of the computing device 100 is. In an additional exemplary embodiment, the benchmark operation may be different according to what the module of another computing device triggering or requesting the benchmark operation of the computing device 100 is. For example, when the module triggering the benchmark operation of the computing device 100 is the first module, the computing device 100 may provide performance information for all input models, and when the module triggering the benchmark operation of the computing device 100 is the second module, the computing device 100 may additionally provide block-unit performance information of the input model jointly with providing the performance information for all of the input models. As another example, when the module triggering the benchmark operation of the computing device 100 is the first module, the computing device 100 may provide a benchmark result for determining a target node which is to execute the learning model corresponding to the input dataset or the converted learning model, and when the module triggering the benchmark operation of the computing device 100 is the second module, the computing device 100 may provide a benchmark result including the configuration data used for generating the compressed model corresponding to the input model.

As a non-limiting example, a plurality of modules triggering the benchmark operation of the computing device 100 may include a first module generating the learning model based on the input dataset, a second module generating the compressed model by compressing the input model, and a third module generating the download data for deploying the input model in at least one target node.

In an exemplary embodiment, the benchmark request information may include information on whether to convert the model. The converting for the input model may be performed based on whether to convert the model, which is included in the benchmark request information.

In an exemplary embodiment, when the computing device 100 determines to convert the artificial intelligence based model to correspond to the target type information, the computing device 100 may determine a specific convert among a plurality of converters by using information related to the input model. For example, the computing device 100 may determine converter identification information corresponding to the combination of the model type information of the input model and the target type information. A converter corresponding to the determined converting identification information may be determined, and the converting operation may be performed by the determined converter. For example, the computing device 100 may acquire a target model into which the artificial intelligence based model is converted by using the model file corresponding to the artificial intelligence based model and the converter identification information corresponding to the combination of the model type information and the target type information. As described above, when it is determined that the converting is performed, the converting may be performed by using a model file to be converted and information (e.g., an identifier for identifying a combination of a model type before converting and a model type after converting) for identifying a converter which is to perform the converting. As an example, the converting may be performed by a converting device (e.g., a converting server).

As another example, according to the implementation aspect, the converting may also be performed by the computing device 100. In such an example, when a model file according to a result of a project is an execution environment of another type (e.g., onnxruntime) other than an execution environment of a specific type (e.g., tensorrt), the computing device 100 may convert another type (e.g., onnxruntime) of model into the specific type (e.g., tensorrt) of model by using a converting function, and provide the model file according to the converting result.

In an exemplary embodiment, the artificial intelligence based model may be converted into the target model by using a docker image of the converter corresponding to the converter identification information on a virtual operating system. For example, an entity (e.g., the converting server) performing the converting acquires a docker image corresponding to the input converter identification information, and executes an sh file of the converter in a docker to convert the model. Here, the sh file may represent a file including instructions to be executed in the docker.

In an exemplary embodiment, the benchmark result may include first type of quantitative information related to the time and second type of quantitative information related to the memory usage.

In an exemplary embodiment, the benchmark result acquired as the target model is executed in at least one target node may include preprocessing time information required for preprocessing of inference of the target model in at least one target node, inference time information required for inferring the target model in at least one target node, preprocessing memory usage information used for preprocessing the inference of the target model in at least one target node, inference memory usage information used for inference of the target model in at least one target node, inference time related quantitative information acquired as the target model is inferred repeatedly at a predetermined number of times in at least one target node, and/or quantitative information related to the memory usage for each of an NPU, a CPU, and a GPU acquired as the target model is inferred in at least one target node.

In an exemplary embodiment, the preprocessing time information may include, for example, time information required for preprocessing before an inference operation is performed such as calling the model. Additionally, the preprocessing time information may also include quantitative information (e.g., a minimum value, a maximum value, and/or an average value of a time required for prior inference) related to a time required for prior inference when the prior inference is repeated at a predetermined number of times for activation of a GPU before measuring a value for inference.

In an exemplary embodiment, the inference time information as time information required in an inference process may be used to encompass, for example, minimum time information, maximum time information, average time information, and/or median time information among the time information required for an initial inference operation for the model and/or inference time information when inference is repeated at a predetermined number of times. Additionally, for example, in a situation in which an operation which may not be processed in the NPU is received and processed by the CPU, the NPU becomes in an idle state, and the inference time information may include a first cycle value when the NPU becomes in the idle state. Additionally, the inference time information may also include a second cycle value when the inference is performed by the NPU and/or a third cycle value acquired by aggregating the first cycle value and the second cycle value.

In an exemplary embodiment, the benchmark result information may also include total time information acquired by aggregating the preprocessing memory usage information and the quantitative information related to the inference time.

In an exemplary embodiment, the benchmark result information may additionally include an RAM usage, a ROM usage, a total memory usage, and/or a quantitative value for an SRAM area used by the NPU.

In an exemplary embodiment, when a plurality of benchmark results is generated as multiple nodes are selected as the target node, the computing device 100 may align the plurality of benchmark results based on the latency. For example, the benchmark results may be aligned and output in an order in which the latency is smallest. In an additional exemplary embodiment, when the latency is within a predetermined similar range or there is a benchmark result corresponding to each of a plurality of same nodes, the benchmark results may be aligned additionally based on the memory usage and/or the CPU occupancy rate. The alignment for the benchmark results may include a feature related to the alignment in the candidate node list.

In an exemplary embodiment, the benchmark result may include, for example, the table type data structure.

In an exemplary embodiment, the computing device 100 may transmit the benchmark request information according to whether wireless communication of a plurality of connected nodes is enabled by a different scheme. The wireless communication may include, for example, HTTP communication. For example, when the benchmark request is delivered to an independent node in which the wireless communication is enabled, the computing device 100 may transmit the benchmark request information to the corresponding node or a server related to the corresponding node. For example, when intending to deliver the benchmark request to a node incapable of wireless communication, the computing device 100 may transmit the benchmark request information to a node (e.g., Rpi4) capable of wireless communication, to which the node incapable of wireless communication is connected through USB/GPIO. The corresponding node (e.g., a node capable of HTTP communication) receiving the benchmark request information may acquire the benchmark result by a scheme of executing a program in a node (e.g., a node incapable of HTTP communication) to be benchmarked, which is connected by using serial communication through USB/GPIO connection. An estimated usage memory may be measured by a scheme of executing an execution environment corresponding to a target model type to be executed in the independent node capable of wireless communication. A benchmark program to be driven in the node incapable of wireless communication, which is to be benchmarked may be made and compiled by using the measured estimated usage memory and the benchmark request information. The made and compiled program may be flashed to the node incapable of wireless communication, which is to be benchmarked through the serial communication. The benchmark result in the node incapable of wireless communication may be acquired by such a scheme.

In an exemplary embodiment, the computing device 100 may acquire the benchmark result through the following method when a node (e.g., a virtual node) which is impossible to be identifiable from the outside) is included in the target node.

The computing device 100 may transmit, to the node, a first acknowledgment message including a benchmark task for benchmarking the target model in the node in response to reception of a first low-power wireless signal from the node which is impossible to be identifiable from the outside. For example, the first low-power wireless signal may include a beacon signal. For example, the first low-power wireless signal may include whether the node performing the benchmark, the memory usage of the node, and hardware identification information of the node.

The computing device 100 may receive, from the node, a second low-power wireless signal (e.g., a callback signal) including the benchmark result generated by the node. In an additional exemplary embodiment, the computing device 100 may determine that the benchmark task in the node is unsuccessful and set the node in an inactive state when the callback signal is not received for a predetermined threshold waiting time. The computing device 100 may set the state of the node to an active state in response to reception of a third low-power wireless signal (e.g., the beacon signal) from the node which is set in the inactive state. Here, the benchmark task included in the first acknowledge message may include target model information which may be downloaded to the node and node configuration information used for converting the target model, which may be downloaded to the node. Further, the benchmark result generated by the node may include a result acquired as the target model is executed in the execution environment of the node based on the node configuration information and the target model information.

Figure 9:
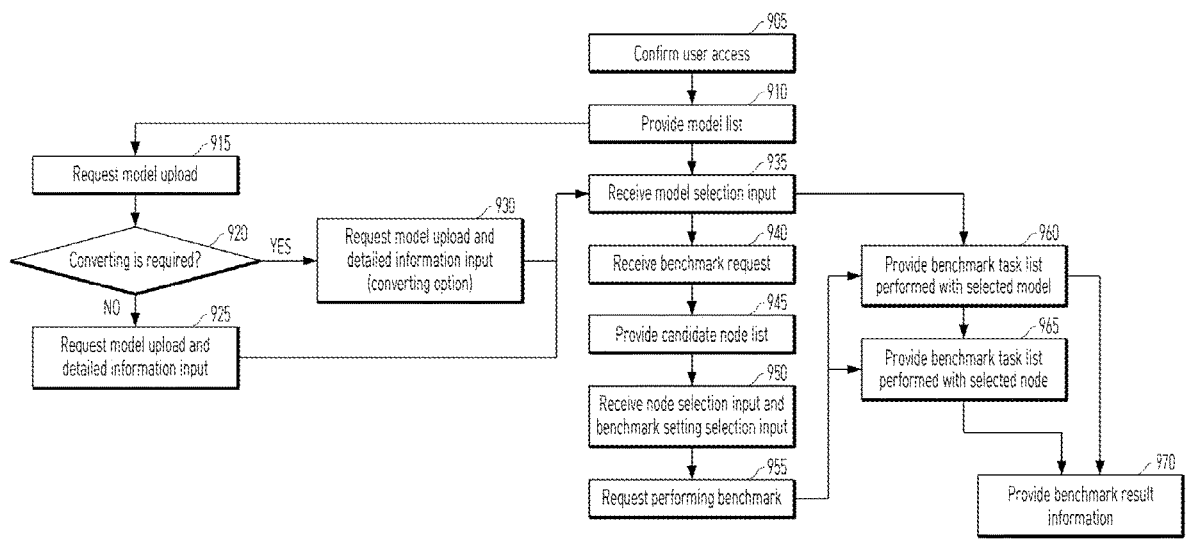
FIG. 9 illustratively illustrates a method for providing a benchmark result according to an exemplary embodiment of the present disclosure.

FIG. 9 illustratively illustrates a method for providing a benchmark result according to an exemplary embodiment of the present disclosure.

The method illustrated in FIG. 9 may be performed by the first computing device 310, the second computing device 320, and/or the computing device 100. For convenience of description, hereinafter, it will be exemplified that the method of FIG. 9 is performed by the computing device 100.

In an exemplary embodiment, the computing device 100 may confirm the access of the user (905). The access by the user is enabled in a project, a platform, a webpage, and/or a mobile page provided by the computing device 100, and the computing device 100 may generate the learning model through the dataset input by the accessing user, generate the compressed model by compressing the learning model, and/or generate download data so that the model may be deployed in the node.

In an exemplary embodiment, the computing device 100 may provide a model list (910).

In an exemplary embodiment, the computing device 100 may receive an input for requesting the model list from the user, and generate the model list to be provided to the user in response to the input.

In an exemplary embodiment, the model list may include, for example, a list of models which may perform the benchmark, a list of models capable of learning the dataset, a list of models which are compressible, a list of models which are suitable for a specific artificial intelligence task, a list of models which are recommended to the user, and/or a list of models which requests the input of the user. As an example, the list of the models may include a size of input data permitted by the model and/or model-specific latency information.

In an exemplary embodiment, the computing device 100 may request uploading a model which intends to acquire the benchmark result (915). As an example, the computing device 100 may request input or upload for the model file, the dataset, the inference task, the model type information corresponding to the model file, and/or the target type information to be benchmarked.

In an exemplary embodiment, the computing device 100 may determine whether converting is required in performing the benchmark (e.g., in generating the candidate node list and/or in acquiring the benchmark result) (920). For example, when there is a difference between type information of the uploaded model and the target type information to be benchmarked, it may be determined that converting is required. As another example, when there is a user input for requesting converting, the computing device 100 may determine that converting is to be performed.

In an exemplary embodiment, when it is determined that converting is not required, an input for detailed information may be requested jointly with the upload for the model (925). For example, the computing device 100 may request the input for the detailed information such as the inference task, a format of an artificial intelligence based model to be used, a storage place (e.g., a local storage and a cloud storage) of an uploaded dataset, a learning scheme, a purpose (e.g., a learning purpose, a verification purpose, and a test purpose) of the dataset, a target latency, and/or a name of the project.

In an exemplary embodiment, when it is determined that converting is required, the input for the detailed information may be requested and a converting option may be provided jointly with the upload for the model (930). For example, the converting option may include announcing that the model uploaded by the user is to be converted into another type of model, inducing a specific model among models to be converted to be selected, providing performance information of each of the models to be converted, or requesting an input for confirming to conduct converting from the user.

In an exemplary embodiment, the computing device 100 may receive a model selection input from the user (935). The model selection input from the user may include information on a model selected by the user among a plurality of recommended models, information on the model to be converted, which is selected by the user, and/or information on a model to be benchmarked, which is selected by the user. As another example, the model selection input may also include an input of selecting the target model and the target node.

In an exemplary embodiment, the computing device 100 may receive a benchmark request (940). For example, the benchmark request may include an input of intending to benchmark the determined target model.

In an exemplary embodiment, the computing device 100 may provide the candidate node list for selecting the target node in response to the benchmark request (945). The candidate node list may be data which is generated by the computing device 100 or generated by another computing device connected to the computing device 100, and stored in the computing device 100. A specific description of the candidate node list will be replaced with the description of FIGS. 4 and 8 described above.

In an exemplary embodiment, the computing device 100 may receive a user input of selecting the target node in the candidate node list and an input related to benchmark setting (950). For example, selection for at least one target node in the candidate node list may be permitted. For example, the input related to the benchmark setting may include information to be included in the benchmark result, a batch size in an inference process, identification information of the target model, software version information of the target model, hardware identification information of the target device, an output data type (e.g., FP32, FP16, INT8, INT4, etc.) of the target model, a target latency of the model in a learning process, an image size of the model in the learning process, and/or a learning epoch.

In an exemplary embodiment, the computing device 100 may receive a benchmark performing request (955). In response to the benchmark performing request, the computing device 100 may generate benchmark result information by executing the target model according to the benchmark setting by the target device.

In an exemplary embodiment, the computing device 100 may provide a list of benchmark tasks performed by the selected model (960). In an exemplary embodiment, step 960 may be performed in response to step 935 or performed in response to step 955. For example, the list of the benchmark tasks in step 960 may include benchmark result information of benchmark tasks performed based on a specific model. As an example, a list of benchmark result information in which the benchmark is made at different nodes and/or at different times for the specific model may correspond to the list of the benchmark tasks in step 960.

In an exemplary embodiment, the computing device 100 may provide a list of benchmark tasks performed for the selected node (965). For example, the list of the benchmark tasks in step 965 may include benchmark result information of benchmark tasks performed based on a specific node. As an example, a list of benchmark result information in which the benchmark is made at different models and/or at different times for the specific node may correspond to the list of the benchmark tasks in step 965.

In an exemplary embodiment, the computing device 100 may provide the benchmark result information (970). A specific description of the benchmark result information will be replaced with the above-described contents in FIGS. 4 and 8.

Figure 10:
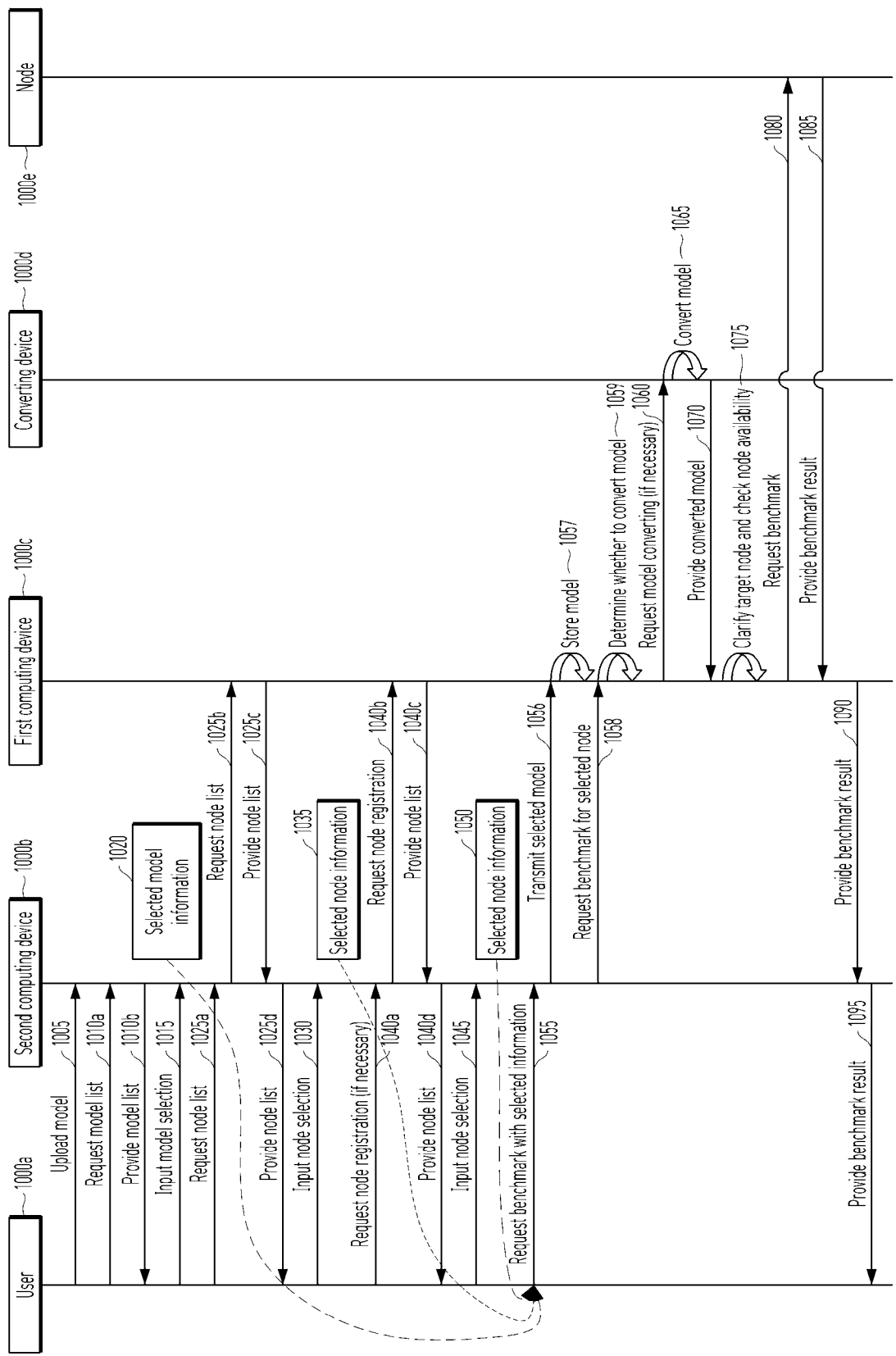
FIG. 10 illustratively illustrates a method for providing a benchmark result according to an exemplary embodiment of the present disclosure.

FIG. 10 illustratively illustrates a method for providing a benchmark result according to an exemplary embodiment of the present disclosure.

Entities 1000a, 1000b, 1000c, 1000d, and 1000e illustrated in FIG. 10 are exemplified for the purpose of the description, and additional entities may be used for implementing a method for providing the benchmark result or some of the entities may also be excluded or integrated according to the implementation aspect. For example, at least two entities of a second computing device 1000b, a first computing device 1000c, a converting device 1000d, and a node 1000e may be integrated into one entity. As another example, at least one of the second computing device 1000b and the first computing device 1000c may be divided into a plurality of computing devices, and operated.

In an exemplary embodiment, a user 1000a may include an entity that accesses the second computing device 1000b through a computing device such as a terminal capable of wired/wireless communication.

In an exemplary embodiment, the second computing device 1000b may include an entity that is capable of interacting with the user 1000a. For example, the second computing device 1000b may provide a user interface so that the user 1000a may select and enjoy a project related to at least one of the second computing device 1000b, the first computing device 1000c, the converting device 1000d, and the node 1000e. For example, various inputs such as model selection, node selection, benchmark setting, compression scheme setting, and/or learning scheme selection from the user 1000a through the user interface of the second computing device 1000b receive. In an exemplary embodiment, the second computing device 1000b may provide, to the user 1000a, various projects such as a modeling project for the artificial intelligence based model, a compression project, a download data generation project deploying the model, and/or a benchmark project.

In an exemplary embodiment, the second computing device 1000b may be configured to trigger an operation of the first computing device 1000c. As a result, an operation related to the benchmark of the first computing device 1000c may be performed in response to a signal from the second computing device 1000b. In an additional exemplary embodiment, the second computing device 1000b may also interact with the converting device 1000d and the node 1000e. In an exemplary embodiment, the second computing device 1000b may correspond to the second computing device 320 in FIG. 3.

In an exemplary embodiment, the first computing device 1000c may provide the benchmark result to the second computing device 1000b and/or the user 1000a. The first computing device 1000c may acquire a benchmark result for a model and a node desired by the user 1000a through interaction with the converting device 1000d and/or the node 1000e. In an exemplary embodiment, the first computing device 1000c may acquire a corresponding benchmark result based on the selected node information and the selected model information. In an exemplary embodiment, the first computing device 1000c may correspond to the first computing device 310 in FIG. 3.

In an exemplary embodiment, the converting device 1000d may perform the converting operation for the model. The converting device 1000d may be present separately according to the implementation aspect, or also present in a type to be integrated into at least one of the second computing device 1000b and/or the first computing device 1000c. In an exemplary embodiment, the converting device 1000d may correspond to the converting device 390 in FIG. 3.

In an exemplary embodiment, the node 1000e may include one or more nodes. The node 1000e may represent a target in which the selected model is benchmarked. In an exemplary embodiment, the node 1000e may be under the management of the first computing device 1000c and/or the second computing device 1000b. In this case, the benchmark in the corresponding node may be executed and the node 1000e may transmit the benchmark result information to at least one of the first computing device 1000c and/or the second computing device 1000b, in response to the benchmark request from the first computing device 1000c and/or the second computing device 1000b. In an exemplary embodiment, the node 1000e is enabled to operate in a form of being included in the first computing device 1000c and/or the second computing device 1000b.

In an exemplary embodiment, the user 1000a accesses the second computing device 1000b to upload the model through the user interface provided by the second computing device 1000b (10005). As an example, uploading the model may include delivering a link capable of uploading the dataset or downloading the dataset. As an example, uploading the model may include delivering a modeled model file or a link capable of downloading the modeled model file. As an example, uploading the model may also include delivering inference task information, target model information to be benchmarked, and/or model type information corresponding to the uploaded model.

In an exemplary embodiment, the second computing device 1000b may receive a model list request from the user 1000a(1010a). The model list may include information on a plurality of models capable of modeling or capable of performing the benchmark. As an example, information on models included in the model list may be determined based on the benchmark task and/or the dataset input by the user 1000a.

In an exemplary embodiment, the second computing device 1000b may provide a model list including information on a plurality of models capable of modeling or capable of performing the benchmark (1010b). For example, the information on the plurality of models may include an identification of the model, a size of data which is enabled to be input into the model, the inference scheme of the model, the learning scheme of the model, a neural network structure of the model, a feature of the model, quantitative information related to the performance of the model, and/or node information suitable for the model.

In an exemplary embodiment, the second computing device 1000b may receive a user input of selecting at least one model in the model list from the user 1000a (1015).

In an exemplary embodiment, the second computing device 1000b may store model information 1020 selected in response to the user input of selecting the model. For example, the selected model information 1020 may include a model type to be benchmarked, a model type to be learned, a model type to be compressed, a model type to be deployed, a model file, a model identifier, and/or a model type corresponding to the dataset.

In an exemplary embodiment, the second computing device 1000b may provide a candidate node list corresponding to the model information 1020 selected in response to the user input of selecting the model. In an exemplary embodiment, the second computing device 1000b may also deliver, to the first computing device 1000c, the model information 1020 selected in response to the user input of selecting the model.

In an exemplary embodiment, the second computing device 1000b may receive a node list request from the user 1000a(1025a). The second computing device 1000b may transmit the node list request to the first computing device 1000c (1025b). The first computing device 1000c may provide a node list to the second computing device 1000b (1025c). The second computing device 1000b may provide the node list to the user 1000a (1025d). In an exemplary embodiment, the node list may include a list of nodes which are ready for performing the benchmark among a plurality of nodes. In an exemplary embodiment, the node list may include a list of candidate nodes corresponding to the selected model information 1020 among the plurality of nodes.

In an exemplary embodiment, the second computing device 1000b may receive a node selection input from the user 1000a (1030). The node selection input may mean an input of selecting at least one node (e.g., at least one target node) in the provided node list.

In an exemplary embodiment, the second computing device 1000*b* may store node information 1035 selected in response to the user input of selecting the node. In an exemplary embodiment, the second computing device 1000*b* may also deliver, to the first computing device 1000*c*, the node information 1035 selected in response to the user input of selecting the node.

In an exemplary embodiment, there may be a situation in which there is no target node which the user 1000*a* intends to select in the node list, the user 1000*a* intends to newly register a specific node, or the user 1000*a* intends to benchmark an additional node in addition to the selected node information 1035. The second computing device 1000*b* may receive a node registration request from the user 1000*a* (1040*a*). The second computing device 1000*b* may transmit the node registration request to the first computing device 1000*c* (1040*b*). The first computing device 1000*c* may register or store, in a DB related to devices, information on a corresponding node in response to the node registration request. The first computing device 1000*c* may provide the node list including the registered or stored node to the second computing device 1000*b*. The second computing device 1000*b* may provide the received node list to the user 1000*a*. In an exemplary embodiment, the node list may include a list of nodes which are ready for performing the benchmark among a plurality of nodes. In an exemplary embodiment, the node list may include a list of candidate nodes corresponding to the selected model information 1020 among the plurality of nodes.

In an exemplary embodiment, the second computing device 1000*b* may receive a node selection input from the user 1000*a* (1045). The node selection input may mean an input of selecting at least one node (e.g., at least one target node) in the provided node list. In an exemplary embodiment, the second computing device 1000*b* may store node information 1050 selected in response to the user input of selecting the node. In an exemplary embodiment, the second computing device 1000*b* may also deliver, to the first computing device 1000*c*, the node information 1050 selected in response to the user input of selecting the node.

In an exemplary embodiment, the second computing device 1000*b* may receive a request for conducting the benchmark with information selected by the user 1000*a* (1055). In an exemplary embodiment, the selected information may include selected model information 1020, selected node information 1035, and/or selected node information 1050. For example, the benchmark request in step 1055 may include a request for benchmarking one selected model 1020 in a plurality of selected nodes 1035 and 1050.

In an exemplary embodiment, the second computing device 1000*b* may transmit the selected model to the first computing device 1000*c* (1056). In an exemplary embodiment, the first computing device 1000*c* may store the received model (1057). In an exemplary embodiment, the second computing device 1000*b* may transmit the benchmark request for the selected node to the first computing device 1000*c*.

In an exemplary embodiment, the first computing device 1000*c* may determine whether to convert the received model (1059). The first computing device 1000*c* may determine whether to convert the model based on the received model information and the selected node information. For example, the first computing device 1000*c* may determine whether to convert the model based on whether the received model is supported in the selected node or whether the operator included in the received model is supported in the selected node. For example, the received model may not be supported in the selected node. In this case, the first computing device 1000*c* may determine whether to convert the received model or whether to convert at least some of the operators included in the received model. As another example, when the received model is not supported in the selected node, the first computing device 1000*c* may determine that converting the received model is required or also determine to change the selected node to another node.

In an exemplary embodiment, when it is determined that converting is required, the first computing device 1000*c* may request converting the model to the converting device 1000*d* (1060). For example, the model converting request may include converting identification information indicating a combination of the type of model to be converted and the type of model after converting.

In an exemplary embodiment, the converting device 1000*d* may convert the model in response to the model converting request (1065). For example, the converting device 1000*d* may determine a converter corresponding to a converting identification information included in the model converting request among a plurality of converters, and convert the model by using the determined converter. The converting device 1000*d* may generate the converted model.

In an exemplary embodiment, the converting device 1000*d* may transmit the converted model to the first computing device 1000*c*. The first computing device 1000*c* may determine, clarify, or embody the target node from the converted model, and check an availability for the target node (1080). For example, when the determined target node executes another current benchmark task or available memories or available CPUs of the target node are not present as large as a predetermined quantity, the first computing device 1000*c* keeps the benchmark request in a queue, and issue the benchmark request when the target node becomes available.

In an exemplary embodiment, when the determined target node is in an available state, the first computing device 1000*c* may transmit the benchmark request to the node 1000*e*. For example, the benchmark request may include information on the target model and the target node.

In an exemplary embodiment, the node 1000*e* performs the benchmark for the target model based on the information included in the benchmark request, and generate a benchmark result. A specific description of the benchmark result will be replaced with the contents described in FIGS. 4 and 8. The node 1000*e* may provide the benchmark result to the first computing device 1000*c* (1085). The first computing device 1000*c* may provide the benchmark result to the second computing device 1000*b* (1090). The second computing device 1000*b* may provide the benchmark result to the user 1000*a*.

Figure 11:
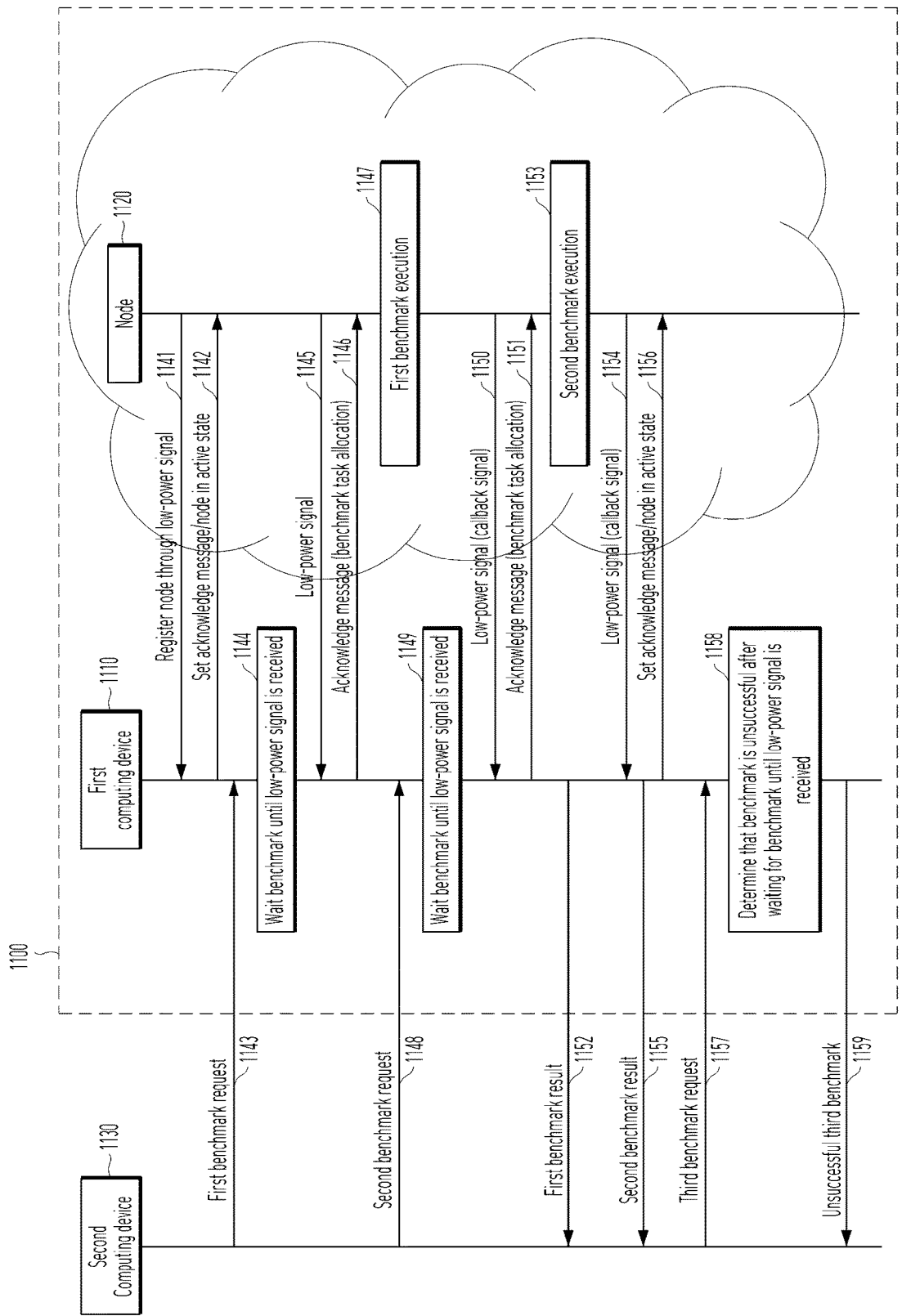
FIG. 11 illustratively illustrates a method for providing a benchmark result for a node which is unidentifiable from the outside according to an exemplary embodiment of the present disclosure.

FIG. 11 illustratively illustrates a method for providing a benchmark result for a node which is unidentifiable from the outside according to an exemplary embodiment of the present disclosure.

The exemplary embodiments illustrated in FIG. 11 represent an interaction among the first computing device 1110, the second computing device 1130, and the node 1120 when the node 1120 is unidentifiable from the outside, such as a virtual node performs the benchmark as the target node.

The description of the duplicated contents with FIGS. 3 to 10 among the descriptions in FIG. 11 will be omitted and replaced with the above descriptions in order to avoid the duplication of the description.

In an exemplary embodiment, a system 1100 for providing the benchmark result may include the first computing device 1100 and the node 1120. As another example, the system 1100 for providing the benchmark result may also include the second computing device 1130, the first computing device 1110, and the node 1120. As another example, the system 1100 for providing the benchmark result may also include the first computing device 1110, and the second computing device 1130 and the node 1120 may also be present outside the system 1100.

In an exemplary embodiment, the first computing device 1110 may determine whether the target node is a node which is disabled to be identifiable from the outside, whether the target node is a node which is enabled to be identifiable from the outside, or whether the target node is a node capable of wireless communication (e.g., HTTP communication) based on the identification information of the target node included in the received benchmark request. When the target node is determined as the node which is disabled to be identifiable from the outside, a technique according to an exemplary embodiment of the present disclosure may be implemented by an exemplary method according to FIG. 11.

Here, "the outside" may mean, for example, the outside of a network accessed by the node 1120. For example, the node 1120 which is unidentifiable from the outside may be used as a meaning that encompasses a node which is in a state of being incapable of devices inside the network from the outside of the network, a node incapable of accessing the network from the outside, a node which may not be viewed from the outside and is enabled to be confirmed through the beacon signal, a node which is enabled to be identifiable through the beacon signal transmitted by the node as the access to the network from the outside is impossible, or the virtual node.

In an exemplary embodiment, the node 1120 may periodically transmit a low-power signal such as the beacon signal to the outside (e.g., the first computing device 1110). As a non-limiting example, a transmission cycle of the beacon signal transmitted by the node 1120 may have various values such as 3 minutes, 2 minutes, 1 minute, 30 seconds, and/or 20 seconds. The first computing device 1110 is capable of interacting with the node 1120 by a scheme of transmitting and receiving the low-power signal, and may perform the benchmark operation with the node 1120 by a scheme in which specific data (e.g., benchmark result information, information for benchmark allocation, information indicating whether to be capable of performing the benchmark, node registration information, etc.) is included in the low-power signal.

Entities 1110, 1120, and 1130 illustrated in FIG. 11 are exemplified for the purpose of the description, and additional entities may be used for implementing a method for providing the benchmark result for the node which is unidentifiable from the outside or some of the entities may also be excluded or integrated according to the implementation aspect. For example, at least two entities of the second computing device 1130, the first computing device 1110, and the node 1120 may be integrated into one entity. As another example, at least one of the second computing device 1120 and the first computing device 1110 may be divided into a plurality of computing devices, and operated.

In an exemplary embodiment, the second computing device 1130 may include an entity that is capable of interacting with the user and the first computing device 1110. For example, the second computing device 1130 may provide the user interface so that the user may select and enjoy the project. For example, various inputs such as model selection, node selection, benchmark setting, compression scheme setting, and/or learning scheme selection from the user may be received through the user interface of the second computing device 1130. In an exemplary embodiment, the second computing device 1130 may provide, to the user, various projects such as a modeling project for the artificial intelligence based model, a compression project, a download data generation project for deploying the model, and/or a benchmark project.

In an exemplary embodiment, the second computing device 1130 may be configured to trigger the operation of the first computing device 1110. As a result, an operation related to the benchmark of the first computing device 1110 may be performed in response to a signal from the second computing device 1130. In an additional exemplary embodiment, the second computing device 1130 may also interact with the node 1120. In an exemplary embodiment, the second computing device 1130 may correspond to the second computing device 320 in FIG. 3 and/or the second computing device 1000*b* in FIG. 10.

In an exemplary embodiment, the first computing device 1110 may provide the benchmark result to the second computing device 1130 and/or the user. The first computing device 1110 may acquire the benchmark results for the model and the node received from the second computing device 1130 through the interaction with the node 1120. In an exemplary embodiment, the first computing device 1110 may acquire a corresponding benchmark result based on the selected node information and the selected model information. In an exemplary embodiment, the first computing device 1110 may correspond to the first computing device 310 in FIG. 3 and/or the first computing device 1000*c* in FIG. 10.

In an exemplary embodiment, the node 1120 may include one or more nodes. The node 1120 may be enabled to operate in a form of being included in the first computing device 1110. The node 1120 may represent a target in which the selected model is benchmarked. In an exemplary embodiment, the node 1120 may be under the management of the first computing device 1110 and/or the second computing device 1130. In this case, the benchmark in the corresponding node may be executed and the node 1120 may transmit the benchmark result information to at least one of the first computing device 1110 and/or the second computing device 1130, in response to the benchmark request from the first computing device 1110 and/or the second computing device 1130.

In an exemplary embodiment, the first computing device 1110 may receive the low-power signal from the node 1120. For example, the low-power signal may include the beacon signal. For example, herein, the low-power signal may include identification information of the node 1120. As another example, the low-power signal may include a registration request for registering the corresponding node in the first computing device 1110. The first computing device 1110 may store or register the corresponding node 1120 in response to the low-power signal received from the node 1120 (1141). For example, the first computing device 1110 may determine whether the identification information of the node 1120 included in the low-power signal received from the node 1120 is registered in a DB thereof. When the identification information of the node 1120 is not registered in the DB of the first computing device 1110, the first computing device 1110 may store and register the corresponding node 1120 in the DB.

In an exemplary embodiment, the first computing device 1110 may transmit an acknowledge message to the node 1120 in response to the low-power signal (1142). The first computing device 1110 may set the node corresponding to the low-power signal in the active state. For example, the active state may mean a state in which the benchmark operation is possible. For example, the active state may mean a state in which communication for the benchmark operation is possible. For example, the active state may mean a state in which the current benchmark task may be performed by considering the CPU occupancy rate and/or the memory usage.

In an exemplary embodiment, the second computing device 1130 may transmit a first benchmark request to the first computing device 1110 (1143). For example, the first benchmark request may include information related to a model and a node to be benchmarked. In an exemplary embodiment, the first computing device 1110 may determine to which node among a plurality of nodes the first benchmark request is to be transmitted based on the node information included in the first benchmark request. For example, when the node included in the first benchmark request is the node 1120 which is disabled to be identifiable from the outside, the first computing device 1110 may determine to interact with the node 1120 through the method illustrated in FIG. 11 with respect to the first benchmark request.

In an exemplary embodiment, the first computing device 1110 analyzes the first benchmark request to determine whether to convert the model included in the first benchmark request. When it is determined that converting is required, the first computing device 1110 may acquire a converting result for the model included in the first benchmark request.

In an exemplary embodiment, the first computing device 1110 may interact with the node 1120 in order to acquire a benchmark result corresponding to the first benchmark request 1143 in response to the first benchmark request 1143. In another exemplary embodiment, the first computing device 1110 may interact with the node 1120 in order to acquire the candidate node list corresponding to the first benchmark request 1143 in response to the first benchmark request 1143.

In an exemplary embodiment, the first computing device 1110 may wait for a benchmark operation corresponding to the first benchmark request 1143 until the low-power signal is received from the node 1120 (1144). As described above, since the node 1120 is a node which is unidentifiable from the outside, but for example, capable of communication through the beacon signal, the first computing device 1110 may wait for an additional operation for the benchmark until receiving a subsequent low-power signal 1145 from the node 1120.

In an exemplary embodiment, the first computing device 1110 may receive the subsequent low-power signal from the node 1120 (1145). The low-power signal received in step 1145 may include, for example, the beacon signal which is periodically or repeatedly transmitted by the node 1120. The beacon signal may include whether the node 1120 performs the current benchmark, the memory usage of the node 1120, the CPU occupancy rate of the node 1120, and/or the identification information of the node 1120.

In an exemplary embodiment, the first computing device 1110 may generate an acknowledge message for allocating the benchmark task corresponding to the first benchmark request being waiting in response to the low-power signal (1146). The acknowledge message may be delivered from the first computing device 1110 to the node 1120 based on the identification information of the node 1120 included in the low-power signal. For example, the benchmark task included in the acknowledge message may include target model information which may be downloaded to the node 1120 and node configuration information used for converting the target model, which is downloaded to the node 1120.

In an exemplary embodiment, the node 1120 may execute a first benchmark corresponding to the first benchmark request (1147). The node 1120 may deliver, to the first computing device 1110, a first benchmark result acquired by executing the first benchmark through the low-power signal (e.g., callback signal) (1150). The first benchmark result generated by the node may include a result acquired as the target model is executed in the execution environment of the node 1120 based on the node configuration information and the target model information. For example, the callback signal may have a form of the beacon signal. The callback signal (low-power signal) may include the benchmark result information performed by the node 1120. The low-power signal may include a result of performing the benchmark. Specific contents for the benchmark result information will be replaced with the description in FIGS. 4 and 8 in order to avoid the duplication of the description. The first benchmark result may be delivered from the first computing device 1110 to the second computing device 1130 (1152).

In an exemplary embodiment, the second computing device 1130 may deliver a second benchmark request to the first computing device 1110 (1148). For example, the second computing device 1130 may sequentially deliver benchmark requests from a plurality of users to the first computing device 1110. In such an example, a first benchmark request 1143 may be a benchmark request corresponding to a first user, and a second benchmark request 1148 may be a benchmark request corresponding to a second user. As another example, the second computing device 1130 may sequentially deliver a plurality of benchmark requests from one user to the first computing device 1110. In the example of FIG. 11, before benchmark result information corresponding to the first benchmark request 1143 is delivered to the second computing device 1130, the second benchmark request 1148 may be transmitted to the first computing device 1110. The first computing device 1110 may wait for the benchmark until the low-power signal is received in response to the second benchmark request 1148 (1149). In an exemplary embodiment, the first computing device 1110 may transmit, to the node 1120, an acknowledge message for allocating the benchmark task corresponding to the second benchmark request to the node 1120 in response to the low-power signal 1150 received from the node 1120 (1151). As an example, before the first benchmark result 1152 is transmitted to the second computing device 1130, the acknowledge message for allocating the second benchmark request may be delivered to the node 1120. In such an example, the second benchmark request may be delivered to the node 1120 through the acknowledge message corresponding to the low-power signal 1150 including the first benchmark result corresponding to the first benchmark request (1156). As described in the example, a new benchmark task may be allocated to the node 1120 through an acknowledge message the low-power signal (e.g., the beacon signal) including the first benchmark result. The first computing device 1110 may transmit the second benchmark request to the node 1120 while acquiring the first benchmark result. As a result, the low-power signal and an acknowledge message communication resource may be efficiently used between the first computing device 1110 and the node 1120.

In an exemplary embodiment, the node 1120 may execute a second benchmark corresponding to the second benchmark request (1153). As an execution result of the second benchmark, the node 1120 may transmit the low-power signal (e.g., callback signal) including the second benchmark result to the first computing device 1110 (1154). The first computing device 1110 may transmit the second benchmark result to the second computing device 1130 (1155).

In an exemplary embodiment, the second computing device 1130 may transmit a third benchmark request to the first computing device 1110 (1157). The first computing device 1110 may wait for the benchmark until receiving the low-power signal from a corresponding node, and determine that the benchmark corresponding to the third benchmark request is unsuccessful when the low-power signal is not received from the corresponding node (1158). The first computing device 1110 may deliver, to the second computing device 1130, that a third benchmark corresponding to the third benchmark request is unsuccessful (1159). In an exemplary embodiment, the first computing device 1110 may determine that the benchmark task in the corresponding node is unsuccessful and set the corresponding node in the inactive state when the low-power wireless signal is not received for a predetermined threshold waiting time. In an exemplary embodiment, in response to subsequently receiving the low-power wireless signal from the node set in the inactive state, the first computing device 1110 may set the state of the corresponding node to the active state. As an example, when a benchmark request for designating the node set in the inactive state is subsequently received, the first computing device 1110 may deliver, to the second computing device 1130, a result that the corresponding node may not perform the current benchmark and/or a candidate node list in which the corresponding node is excluded from the candidate nodes.

In an additional exemplary embodiment, when the first computing device 1110 transmits the third benchmark request to the node 1120, and does not receive the low-power wireless signal (e.g., a callback signal including the benchmark result) from the node 1120 for the predetermined threshold waiting time, the first computing device 1110 may determine that the benchmark task in the corresponding node is unsuccessful, and set the corresponding node in the inactive state. The first computing device 1110 may deliver, to the second computing device 1130, that the third benchmark corresponding to the third benchmark request is unsuccessful.

In the technique according to the exemplary embodiments of the present disclosure, since the node which is unidentifiable from the outside may be considered when generating the candidate node list and/or when generating the benchmark result, ranges of nodes to be benchmarked may be widened.

Figure 12:
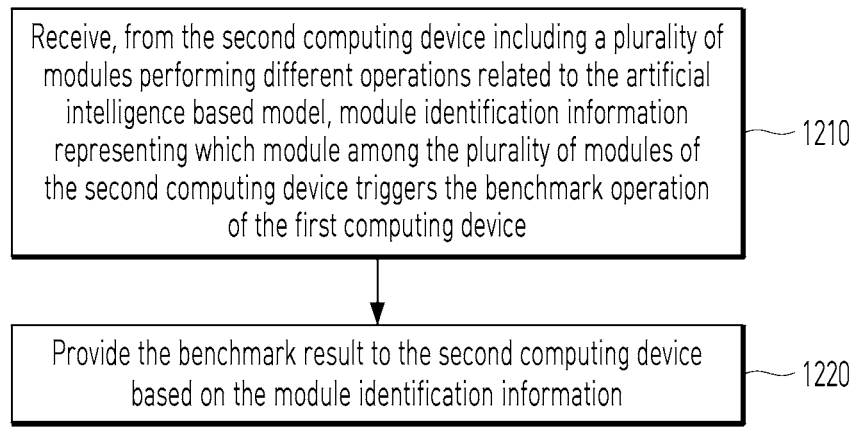
FIG. 12 illustratively illustrates a method for providing a benchmark result according to an exemplary embodiment of the present disclosure.

FIG. 12 illustratively illustrates a method for providing a benchmark result according to an exemplary embodiment of the present disclosure.

In an exemplary embodiment, the method illustrated in FIG. 12 may be performed by the first computing device 310. As another example, the method illustrated in FIG. 12 may be performed by the computing device 100 that encompass the first computing device 310 and the second computing device 320.

Hereinbelow, an example in which steps of FIG. 12 are performed by the first computing device will be described in detail. It will be appreciated by those skilled in the art that some of the steps illustrated in FIG. 12 are omitted or additional steps may be included according to the implementation aspect.

In an exemplary embodiment, the first computing device in FIG. 12 may correspond to the first computing device 310 in FIG. 3, and the second computing device may correspond to the second computing device 320 in FIG. 3. In an exemplary embodiment, the first computing device in FIG. 12 may correspond to the first computing device in FIGS. 4 to 11, and the second computing device may correspond to the second computing device in FIGS. 4 to 11.

In an exemplary embodiment, the first computing device may receive, from the second computing device including a plurality of modules performing different operations related to the artificial intelligence based model, module identification information representing which module among the plurality of modules of the second computing device triggers the benchmark operation of the first computing device (1210).

In an exemplary embodiment, the first computing device may provide a different benchmark result according to what a subject of transmitting the benchmark request thereto is. For example, the second computing device may transmit the benchmark request including the node and the model to the first computing device. The first computing device may identify a sender transmitting the benchmark request, and generate a different benchmark result according to the identified sender. As another example, the second computing device may transmit the benchmark request including the benchmark task to be included in the benchmark result to the first computing device.

In an exemplary embodiment, the first computing device is enabled to interact with each of the modules of the second computing device, and may perform the benchmark by a different scheme and/or acquire a different benchmark result according to which module the first computing device interacts with when interacting with each of the modules.

In an exemplary embodiment, the module identification information may include information for identifying a specific module(s) among the plurality of modules included in the second computing device. For example, the plurality of modules may mean modules that performs different operations in the second computing device. As another example, the plurality of modules may be configured to be present in at least one of the second computing device and the first computing device, and to perform different operations. As yet another example, the plurality of modules may be configured to be present separately outside the second computing device and to perform different operations.

In an exemplary embodiment, the module identification information may include information for identifying a specific module among the plurality of modules included in the second computing device, and benchmark task information. The benchmark task information may include information related to a node and/or a model to be benchmarked. The benchmark task information may include performance target information (e.g., the target latency, etc.) for performing the benchmark. The benchmark task information may include whether converting is required in the process of performing the benchmark and/or the converter identification information. The benchmark task information may describe information to be included in the benchmark result. The benchmark task information may include a benchmark scheme to be performed.

In an exemplary embodiment, the plurality of modules may generate outputs of the respective modules by utilizing the benchmark result by different schemes.

For example, the first module may generate the learning model based on an input dataset. The first module may use the benchmark result for determining a target node which is to benchmark the learning model. The first module may use the benchmark result in order to confirm the performance when executing the learning model in the target node. The first module may use the benchmark result for generating the learning model or a re-learning model. The first module may use the benchmark result for determining the type of learning model or re-learning model, which corresponds to the dataset. The benchmark result may be used for a purpose of evaluating the performance the learning model output from the first module. The performance of the learning model output from the first module may include a memory footprint, latency, a power consumption amount, and/or node information (the execution environment of the node, a processor and/or RAM size, etc.).

For example, the second module compresses an input model to generate a compressed model. The second module may use the benchmark result in order to determine configuration data for the input model.

For example, the third module may generate download data for deploying the input model in at least one target node. The third module may use the benchmark result for generating the download data or converting data into a data type supported by the target node. The third module may use the benchmark result in checking what degree of performance the input model shows in a node having a specification maximally similar to a specification of the node desired by the user.

In an exemplary embodiment, the first computing device may provide the benchmark result to the second computing device based on the module identification information (1220).

In an exemplary embodiment, the first computing device may provide a different benchmark result to the second computing device according to the module identification information. As an example, the first computing device may perform the benchmark by the same scheme, and provide a different benchmark result to the second computing device when the module identification information is different. As another example, the first computing device may perform the benchmark by the different scheme, and provide the different benchmark result to the second computing device when the module identification information is different.

In an exemplary embodiment, when the module identification information indicates the first module, the first computing device may provide, to the second computing device, the benchmark result for determining the target node which is to execute the learning model corresponding to the input dataset or the converted learning model. When the module identification information indicates the second module, the first computing device may provide, to the second computing device, the benchmark result including the configuration data used for generating the compressed model corresponding to the input model.

In an exemplary embodiment, when the module identification information indicates the first module, the first computing device may provide the performance information for all input models, and when the module identification information indicates the second module, the first computing device may provide the performance information for all input models and/or the performance information by the unit of the block of the input model.

In an exemplary embodiment, the first computing device may perform the benchmark by the different scheme according to the module identification information. The benchmark result may be provided to the second computing device. When the module identification information indicates the first module, the first computing device may provide, to the second computing device, a first benchmark result generated based on a predetermined target model being executed in at least one predetermined target node by a first benchmark scheme, and when the module identification information indicates a second module different from the first module, the first computing device may provide, to the second computing device, a second benchmark result generated based on the target model being executed in the at least one target node by the first benchmark scheme. Here, the first benchmark result and the second benchmark result may be different.

As a non-limiting example, the benchmark scheme may include the first benchmark scheme of measuring the performance information for all input models when the input model is executed in the target node. The benchmark scheme may include a second benchmark scheme of measuring the performance information by the unit of the operator of the input model when the input model is executed in the target node. The benchmark scheme may include a third benchmark scheme of measuring the performance information by the unit of the block of the input model when the input model is executed in the target node. According to an exemplary embodiment, the first computing device may generate the benchmark result by combining a plurality of benchmark schemes.

In an exemplary embodiment, when the module identification information indicates a module that performs the operation of generating the learning model, the first computing device may provide, to the second computing device, a benchmark result including first benchmark performance information acquired by executing a plurality of artificial intelligence based models in a plurality of nodes, respectively. For example, the first benchmark performance information may correspond to a table type data structure that expresses a latency according to matching between the plurality of artificial intelligence based models and the plurality of nodes. As a non-limiting example, the data structure 500 illustrated in FIG. 5 may correspond to the table type data structure that expresses the latency.

In an exemplary embodiment, the first benchmark performance information may include arbitrary type performance information when the model is executed in the node in addition to the latency. For example, the first benchmark performance information may also include power mode information, fan mode information, temperature information of the current board, and/or power usage information of the current board. The power mode information may be determined based on how many CPU cores are used. For example, when all of the CPU cores are used, the power mode information may be determined to be MAX and also determined by a scheme of quantitatively expressing the usage like 30 W, 20 W, 15 W, and 10 W. For example, as a quantitative amount of the power mode information is larger, the latency may decrease. As another example, when the power mode is MAX, the latency may decrease as compared with another node not using the power mode. The fan mode information may be expressed as a type of information indicating a strength of a fan like null, quiet, cool and max. As an example, in a case where the fan mode is quiet, the temperature of the board may be lowered as compared with a case where the fan mode is null, so there is a high possibility that the latency will decrease. As an example, when the fan mode is the cool mode, the temperature of the board may be lowered as compared with another mode, so there is a high possibility that the latency will decrease. The current power usage of the board may indicate a power usage acquired from a power measurement sensor connected to the nodes. It may be interpreted that a value of the current power usage of the board is smaller, a usability of the corresponding node increases.

In an exemplary embodiment, the first benchmark performance information may be used for the second computing device to generate estimated performance information of candidate nodes capable of supporting the execution environment of the learning model. For example, the second computing device which interacts with the user may provide a candidate node list including candidate nodes which are capable of supporting the model acquired from the input of the user or which are ready for performing the benchmark through the user interface. When the generating the candidate node list, a preliminary prepared performance table may be used without the interaction with the first computing device and/or the node which is to perform the benchmark. The performance table is a data structure that stores performance information acquired by executing the plurality of models in the plurality of nodes, respectively. Therefore, the second computing device may provide, to the user, a more rapidly and efficiently input data set or information on candidate nodes related to the input model, and performance information of each of the candidate nodes by using a preliminary prepared performance table.

In an exemplary embodiment, the first benchmark performance information may be updated by the first computing device when a new artificial intelligence based model is added, when a new node is added, and/or when the execution environment which is enabled to be supported by the node is updated. In such a situation, by the first computing device, performance measurement for a new added model, a new added node, and/or a model and/or node corresponding to the updated execution environment may be performed, and the performance table may be updated based on the performed performance measurement. As a result, since the first computing device intervenes in a process of providing the candidate node list only for a specific situation, the second computing device may provide, to the user, the estimated performance information of each of the candidate nodes jointly with the information on the candidate nodes by a resource-efficient scheme.

In an exemplary embodiment, when the module identification information indicates the module that generates the learning model, the first computing device may generate a candidate node list including first nodes supporting an execution environment that supports the first operator included in the learning model among nodes supporting the execution environment corresponding to the target type information based on the learning model acquired by the second computing device and the target type information to be benchmarked, and provide the benchmark result including the candidate node list to the second computing device. The first computing device determines nodes which may support the operators included in the learning model among nodes suitable for the target type information to be benchmarked as the candidate node to provide more accurate information on nodes which are to perform the benchmark to the user. For example, when the target type information which is intended to be benchmarked by the user is different from model type information related to the input learning model (or dataset) from the user, an operation of converting the input learning model into the target model corresponding to the target type information should be performed. When the benchmark is performed after the candidate nodes are converted from the input learning model into the target model, a case where the converted target model among preliminarily presented candidate nodes is not supported may occur. As a result, among the nodes capable of supporting the execution environment corresponding to the target type information, the first nodes having an execution environment for supporting the first operator included the learning model may be determined as the candidate nodes. As an example, the first computing device may extract operators included in the input learning model. When among nodes having a runtime matching the target type information, the runtime is matched but the extracted operator is not supported in a version of a runtime supported by the node, a node in which the version of the corresponding runtime is installed may be excluded from the candidate node.

Further, second nodes having an execution environment which does not support a first operator included in the learning model, but supports a second operator different from the first operator, which is capable of replacing the first operator among the nodes having the execution environment corresponding to the target type information may be determined as the candidate nodes. As an example, when there is an operator capable of replacing the operator which is not supported, the first computing device may request replacement or change of the operator to the user, and when the replacement of the operator is requested from the user, the first computing device may make the corresponding node be included in the candidate node and otherwise, exclude the corresponding node from the candidate node.

In an exemplary embodiment, when the module identification information indicates the module that generates the learning model, the first computing device executes the learning model in at least one target node acquired from the second computing device to generate second benchmark performance information in at least one target node of the learning model and provide a benchmark result including the second benchmark performance information to the second computing device.

In an exemplary embodiment, when the module identification information indicates the module that generates the learning model, The first computing device determines whether to convert the learning model based on the model type information corresponding to the learning model and the target type information to be benchmarked, which are acquired from the second computing device, and when it is determined that the learning model is to be converted, the first computing device may acquire a target model in which the learning model is converted to correspond to the target type information by using the model type information and the target type information corresponding to the learning model. The first computing device executes the target model in at least one target node acquired from the second computing device to generate the second benchmark performance information in at least one target node of the target model. For example, the first computing device may determine what the model type corresponding to the input learning model is, and compare the input target type information and the determined model type information, and may determine that converting is required when the input target type information and the determined model type information are different. The first computing device may perform the benchmark by a scheme of executing the converted model in the target node. As described in such an example, when the benchmark is triggered from the module that generates the learning model, the first computing device may perform the benchmark by a scheme of determining whether converting is made and using a model according to a result of determining whether converting is made. As described in such an example, when the benchmark is triggered from the module that generates the learning model, the first computing device may determine whether converting is made and provide the benchmark result of the model according to the result of determining whether converting is made.

In an exemplary embodiment, the first computing device may provide a benchmark result including second benchmark performance information to the second computing device.

In an exemplary embodiment, the second benchmark performance information may include first type of quantitative information related to the time and second type of quantitative information related to the memory usage.

In an exemplary embodiment, the second benchmark performance information acquired as the target model is executed in at least one target node may include preprocessing time information required for preprocessing of inference of the target model in at least one target node, inference time information required for inferring the target model in at least one target node, preprocessing memory usage information used for preprocessing the inference of the target model in at least one target node, inference memory usage information used for inference of the target model in at least one target node, inference time related quantitative information acquired as the target model is inferred repeatedly at a predetermined number of times in at least one target node, and/or quantitative information related to the memory usage for each of an NPU, a CPU, and a GPU acquired as the target model is inferred in at least one target node.

In an exemplary embodiment, the preprocessing time information may include, for example, time information required for preprocessing before an inference operation is performed such as calling the model. Additionally, the preprocessing time information may also include quantitative information (e.g., a minimum value, a maximum value, and/or an average value of a time required for prior inference) related to a time required for prior inference when the prior inference is repeated at a predetermined number of times for activation of a GPU before measuring a value for inference.

In an exemplary embodiment, the inference time information as time information required in an inference process may be used to encompass, for example, minimum time information, maximum time information, average time information, and/or median time information among the time information required for an initial inference operation for the model and/or inference time information when inference is repeated at a predetermined number of times. Additionally, for example, in a situation in which an operation which may not be processed in the NPU is received and processed by the CPU, the NPU becomes in an idle state, and the inference time information may include a first cycle value when the NPU becomes in the idle state. Additionally, the inference time information may also include a second cycle value when the inference is performed by the NPU and/or a third cycle value acquired by aggregating the first cycle value and the second cycle value.

In an exemplary embodiment, the second benchmark performance information may also include total time information acquired by aggregating the preprocessing memory usage information and the quantitative information related to the inference time.

In an exemplary embodiment, the second benchmark performance information may additionally include an RAM usage mount, a ROM usage, a total memory usage, and/or a quantitative value for an SRAM area used by the NPU.

In an exemplary embodiment, the second benchmark performance information may include, for example, the table type data structure.

In an exemplary embodiment, when the module identification information indicates the module that generates the compressed model, the first computing device may provide, to the second computing device, the benchmark result including the configuration data used for generating the compressed model corresponding to the input model. As described above, when the module identification information corresponds to the module that generates the compressed model, the first computing device may provide a benchmark result different from a benchmark result for another module. Such a benchmark result may include a benchmark result related to compression of the model. Such a benchmark result may be acquired through a scheme of performing the benchmark by the unit of the model and/or a scheme of performing the benchmark by the unit of the block. Here, the configuration data may include at least one of a compression mode, a compression algorithm, a compression target, and a compression rate.

For example, the compression mode may include a first compression mode of performing compressing all input models and/or a second compression mode of performing compression by the unit of the block included in the input model. The block in the present disclosure may mean a component constituting the model. For example, the block may correspond to a convolutional layer, an activation function, a normalization function, and/or an arithmetic operation. For example, the block may correspond to at least one layer in the neural network.

For example, the compression algorithm may include various known compression algorithms such as Layer-Adaptive Sparsity for Magnitude-based Pruning (LAMP) and/or Variational Bayesian Matrix Factorization (VBMF). As another example, the compression algorithm may include a compression algorithm that changes the structure of the model, a compression algorithm that separates a channel to reduce a computational amount and the number of variables, a weight pruning algorithm that sets remaining parameters other than a parameter affecting a result to 0, a compression algorithm of performing a quantization scheme that reduces parameters expressed by floating decimal points to a specific bit number, and/or a lightweight algorithm that binarizes parameters.

For example, the compression target is used for representing a block to be compressed among the blocks included in the model.

For example, the compression rate may represent quantitative information related to a compression ratio for model compression or block compression.

In an exemplary embodiment, when the module identification information indicates the compressed model, the first computing device executes the input model by the unit of the block in at least one target node acquired from the second computing device to generate third benchmark performance information representing a block-unit performance of the input model. The first computing device may provide a benchmark result including the third benchmark performance information to the second computing device. In an exemplary embodiment, the third benchmark performance information may include, for example, a block-unit latency of the model. In an exemplary embodiment, the third benchmark performance information may include first type of quantitative information related to the time and second type of quantitative information related to the memory usage by the unit of the block of the model. Specific contents regarding the first type of quantitative information and the second type of quantitative information will be replaced with the described contents of the second benchmark performance information.

The compressed model in the present disclosure may mean a model in which compression is made.

As described above, when the first computing device is triggered from the model that performs compression, the first computing device may provide a benchmark result for efficient compression through a benchmark performing scheme of acquiring benchmark results of all models and/or the block-unit benchmark result.

In the technique according to an exemplary embodiment of the present disclosure, compression may be made by an efficient and accurate scheme with respect to the model (e.g., the learning model generated by the first module) input by using the benchmark result. As a result, the second module that compresses the model may acquire the compressed model by a more efficient and accurate scheme by using the benchmark result.

In an exemplary embodiment, the third module may change the data type to a data type (e.g., 8-bit integer type) supported by the target device, which is different from the data type (e.g., 32-bit real number type) of the input model. In an exemplary embodiment, the third module may also control a quantization interval, and perform quantization based on the controlled quantization interval. As the input model is quantized, a parameter value (e.g., weight) of the model may be changed. The third module may provide download data which the user may install in the node. The download data may include a download file, a link for the download file, and/or a download package. When the download file is installed in the target node, an artificial intelligence based model optimized for the target node may be installed.

In an exemplary embodiment, when the module identification information indicates the third module, the first computing device may provide a benchmark result for generating the download data which allows the input model to be deployed in the target node to the second computing device.

In an exemplary embodiment, when the module identification information indicates the third module, the first computing device may provide, to the second computing device, a benchmark result for converting the data type of the input model into the data type supported by the target node.

In an exemplary embodiment, when the module identification information indicates the third module, the first computing device may provide, to the second computing device, a benchmark result for controlling the quantization interval of the input model. For example, the quantization of the model may include reducing the size of the model by reducing the number of bits used for expressing the weight and/or activation output. The inference time of the model may be shortened by the quantization for the learning model. For example, the quantization interval may be determined as the bit unit such as 16 bits, 8 bits, 4 bits, 2 bits, 1 bit, etc.

FIG. 13, FIG. 14, FIG. 15, FIG. 16, and FIG. 17 exemplarily illustrate various exemplary embodiments of the present disclosure, which provide the benchmark result. For example, the computing device 100 may acquire the benchmark result in response to the benchmark request from the external device. As another example, the computing device 100 is enabled to operate in various schemes such as a scheme in which the computing device 100 operates in a standalone type, a scheme of operating dependently on another computing device which interacts with the user, a scheme of directly performing converting, a scheme of acquiring a converting result from another converting device, a scheme of directly generating the benchmark result, and/or a scheme of receiving the benchmark result from an external computing device.

In order to avoid the duplicated description, specific contents of FIGS. 13, 14, 15, 16, and 17 will be replaced with the corresponding description in FIGS. 3 to 12.

Figure 13:
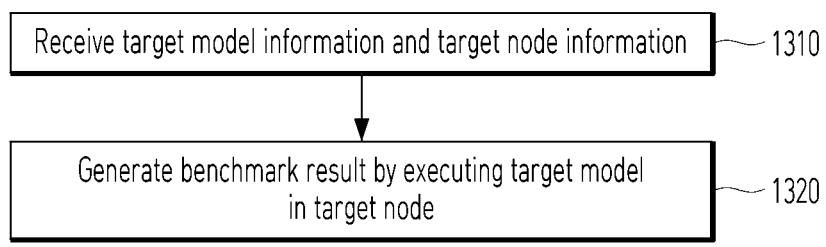
FIG. 13 illustratively illustrates a method for providing a benchmark result according to an exemplary embodiment of the present disclosure.

FIG. 13 illustratively illustrates a method for providing a benchmark result according to an exemplary embodiment of the present disclosure.

The computing device 100 may receive target model information and target node information (1310). In an exemplary embodiment, the target model information may include information related to the model to be benchmarked. For example, the target model information may include the dataset, the model file, the link for the model file, the model file and the model type, and/or the model file and the target type information. In an exemplary embodiment, the target node information may include various types of information for identifying the target node. For example, the target node information may include the identifier of the target node, whether the target node is capable of wireless communication, whether the target node is enabled to be identifiable from the outside, and/or the number of target nodes.

The computing device 100 may generate the benchmark result by executing the target model in the target node (1320).

Figure 14:
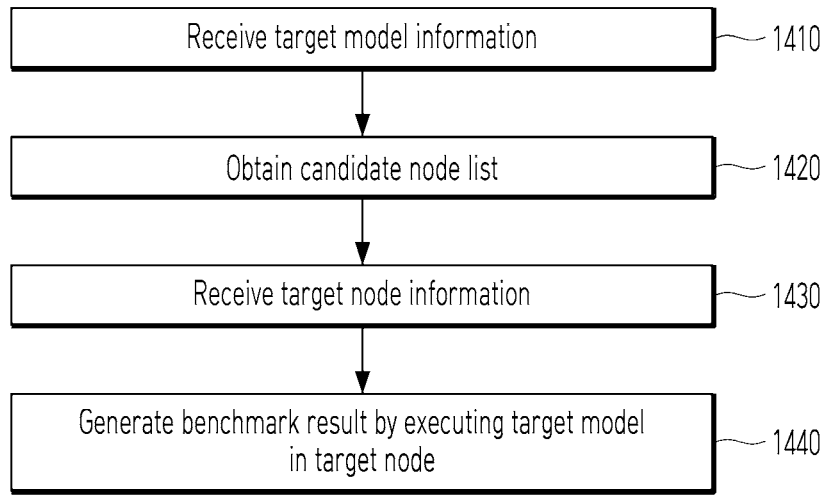
FIG. 14 illustratively illustrates a method for providing a benchmark result according to an exemplary embodiment of the present disclosure.

FIG. 14 illustratively illustrates a method for providing a benchmark result according to an exemplary embodiment of the present disclosure.

The computing device 100 may receive the target model information (1410). The target model information may include the information related to the model to be benchmarked. For example, the target model information may include the dataset, the model file, the link for the model file, the model file and the model type, and/or the model file and the target type information.

The computing device 100 may acquire the candidate node list (1420). The candidate node list may be determined based on the target model information. The candidate node list may include candidate nodes related to the target model information among the plurality of nodes. At least one target node to be benchmarked may be determined according to the selection input in the candidate node list.

The computing device 100 may receive the target node information (1430). In an exemplary embodiment, the target node information may include arbitrary type of information for identifying the target node. For example, the target node information may include the identifier of the target node, whether the target node is capable of wireless communication, whether the target node is enabled to be identifiable from the outside, and/or the number of target nodes. The target node information may be determined based on the selection input in the candidate node list.

The computing device 100 may generate the benchmark result by executing the target model in the target node (1440).

Figure 15:
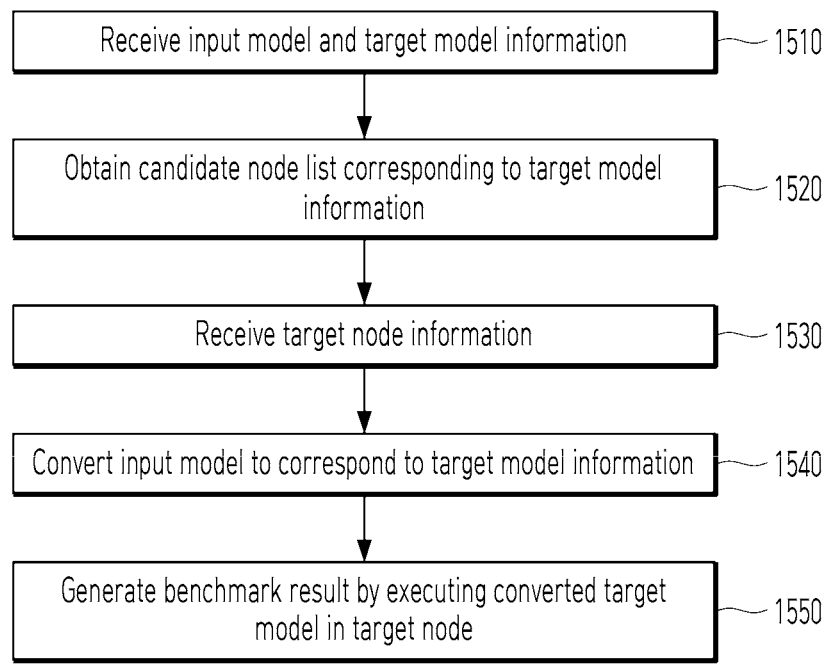
FIG. 15 illustratively illustrates a method for providing a benchmark result according to an exemplary embodiment of the present disclosure.

FIG. 15 illustratively illustrates a method for providing a benchmark result according to an exemplary embodiment of the present disclosure.

The computing device 100 may receive the input model and the target model information (1510). In an exemplary embodiment, the input model may include arbitrary type of information related to the model. For example, the input model may include the dataset, the learning model, the compressed model, information related to learning of the model, information related to compression of the model, information on the operators included in the model, and/or model type information corresponding to the model. The target model information may include arbitrary type of information related to the model to be benchmarked. For example, the target model information may include the target type information and/or information for identifying a model to be converted.

The computing device 100 may acquire a candidate node list corresponding to the target model information (1520). In an exemplary embodiment, the candidate node list may include candidate nodes related to the target model information and/or the input model among the plurality of nodes. For example, the candidate nodes may include nodes that support the execution environment corresponding to the target model information, nodes that support the operators of the input model, and/or nodes that supports a target model in which the input model is converted according to the target model information.

The computing device 100 may receive the target node information (1530). In an exemplary embodiment, at least one target node to be benchmarked may be determined according to the selection input in the candidate node list. In an exemplary embodiment, a candidate node having a best performance based on the performance information in the candidate node list may be automatically determined as the target node.

The computing device 100 may convert the input model to correspond to the target model information (1540). In an exemplary embodiment, the computing device 100 may determine a converting scheme or identification information of the converter by combining first information for identifying the input model and second information corresponding to the target model information. The computing device 100 converts the operators of the input model to correspond to the target model information to generate a converted target model.

The computing device 100 may generate the benchmark result by executing the converted target model in the target node (1550).

Figure 16:
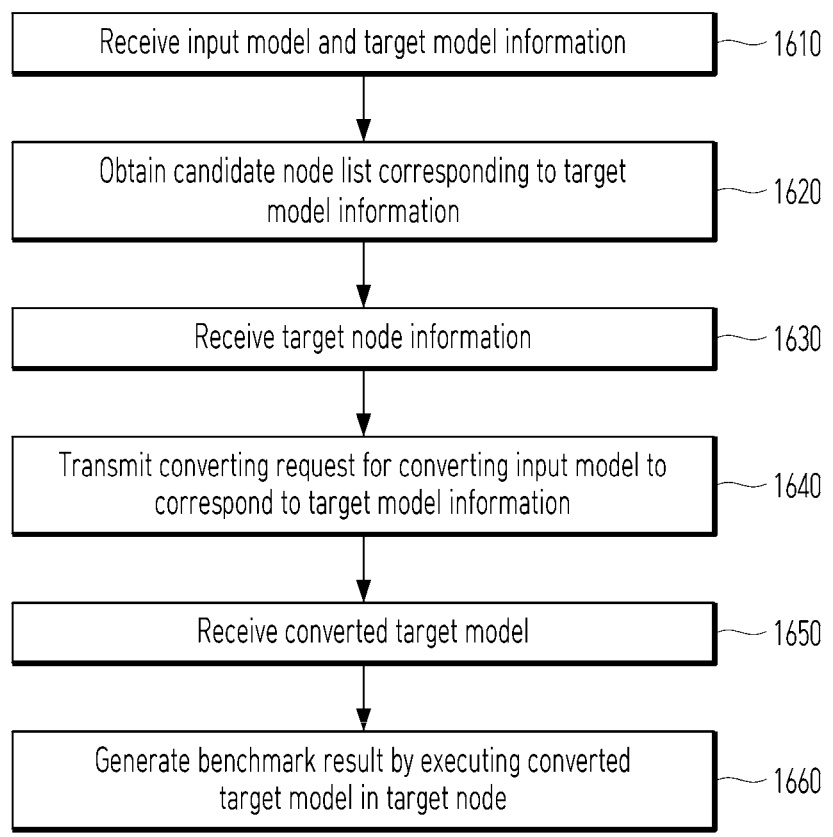
FIG. 16 illustratively illustrates a method for providing a benchmark result according to an exemplary embodiment of the present disclosure.

FIG. 16 illustratively illustrates a method for providing a benchmark result according to an exemplary embodiment of the present disclosure.

The computing device 100 may receive the input model and the target model information (1610). In an exemplary embodiment, the input model may include arbitrary type of information related to the model. For example, the input model may include the dataset, the learning model, the compressed model, information related to learning of the model, information related to compression of the model, information on the operators included in the model, and/or model type information corresponding to the model. The target model information may include arbitrary type of information related to the model to be benchmarked. For example, the target model information may include the target type information and/or information for identifying a model to be converted.

The computing device 100 may acquire a candidate node list corresponding to the target model information (1620). In an exemplary embodiment, the candidate node list may include candidate nodes related to the target model information and/or the input model among the plurality of nodes. For example, the candidate nodes may include nodes that support the execution environment corresponding to the target model information, nodes that support the operators of the input model, and/or nodes that supports a target model in which the input model is converted according to the target model information.

The computing device 100 may receive the target node information (1630). In an exemplary embodiment, at least one target node to be benchmarked may be determined according to the selection input in the candidate node list. In an exemplary embodiment, a candidate node having a most excellent performance based on the performance information in the candidate node list may be automatically determined as the target node.

The computing device 100 may transmit a converting request for converting the input model to correspond to the target model information (1640). In an exemplary embodiment, the converting request may be transmitted to the converting device positioned outside the computing device 100. For example the first computing device may transmit, to the converting device, the model file to be converted and a converting request including UUID of the converter. Here, the UUID is an identifier identified by a combination of the type of model before converting and a model type after converting. The converting device may convert the input model by a scheme of acquiring a docker image of the converter corresponding to the UUID and executing the sh file of the corresponding converter in the docker.

The computing device 100 may receive the converted target model (1650). In an exemplary embodiment, the computing device 100 may receive the converting result from the converting device, and here, the converting result may correspond to the converted target model.

The computing device 100 may generate the benchmark result by executing the converted target model in the target node (1660).

Figure 17:
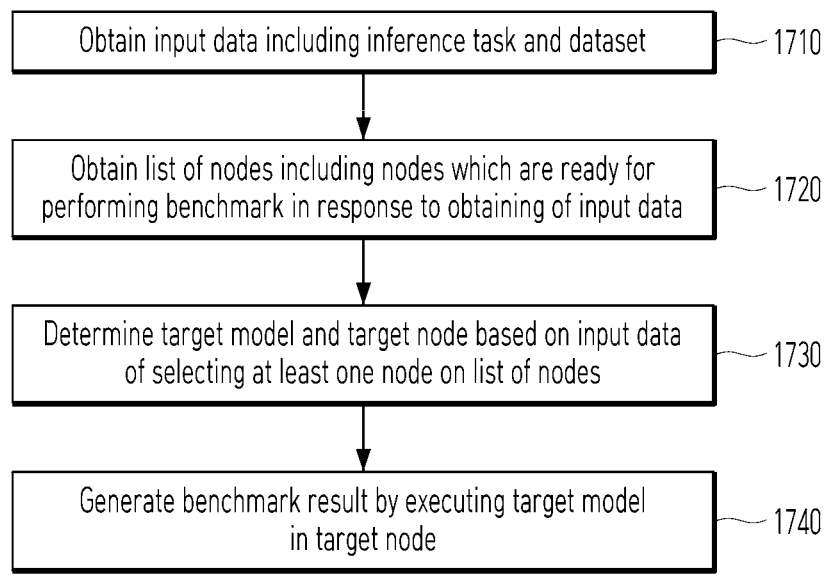
FIG. 17 illustratively illustrates a method for providing a benchmark result according to an exemplary embodiment of the present disclosure.

FIG. 17 illustratively illustrates a method for providing a benchmark result according to an exemplary embodiment of the present disclosure.

The computing device 100 may acquire input data including an inference task and a dataset (1710). In an exemplary embodiment, the inference task may include a purpose or a result to be achieved through inference of the artificial intelligence based model, such as image classification, object detection, semantic segmentation, text prediction, and/or clustering. In an exemplary embodiment, the dataset may include arbitrary type of data used in the artificial intelligence based model. For example, the dataset may mean a set of data in which preprocessing for data is completed. For example, the dataset may mean a set of data in which labeling is completed in the case of supervised learning. For example, the dataset may be used for learning of the artificial intelligence based model, used for performance evaluation in the learning process, and/or used for performance evaluation after learning completion.

The computing device 100 may acquire a list of nodes including nodes which are ready for performing the benchmark in response to acquisition of the input data (1720). In an exemplary embodiment, the computing device 100 may acquire the list including the nodes which are ready for the benchmark, such as currently not performing the benchmark, possessing a memory space capable of performing the benchmark task, or holding a CPU capable of performing the benchmark task. The nodes included in the list may be determined by a process of judging current states of the nodes through communication with the nodes.

The computing device 100 may determine the target model and the target node based on the input data of selecting at least one node in the list of the nodes (1730). In an exemplary embodiment, when a specific node in the list of the nodes is selected as the target node, a list of models supportable by the selected node may be output. In response to an input of selecting a specific model in the list of the models, the target model to be benchmarked may be determined. For example, the list of the models may represent the framework and the software version for each of the models. For example, the list of the models may include identification information for each of the models. For example, the list of the models may include identification information for each of the models and performance information when each of the models is executed in the target node. In an exemplary embodiment, an alignment order of the models in the list may be determined based on the performances of the models or based on selection information of past users. In an exemplary embodiment, when a specific node in the list of the nodes is selected as the target node, the models supportable by the selected node may also be automatically determined without the user input.

The computing device 100 may generate the benchmark result by executing the target model in the target node (1740).

Figure 18:
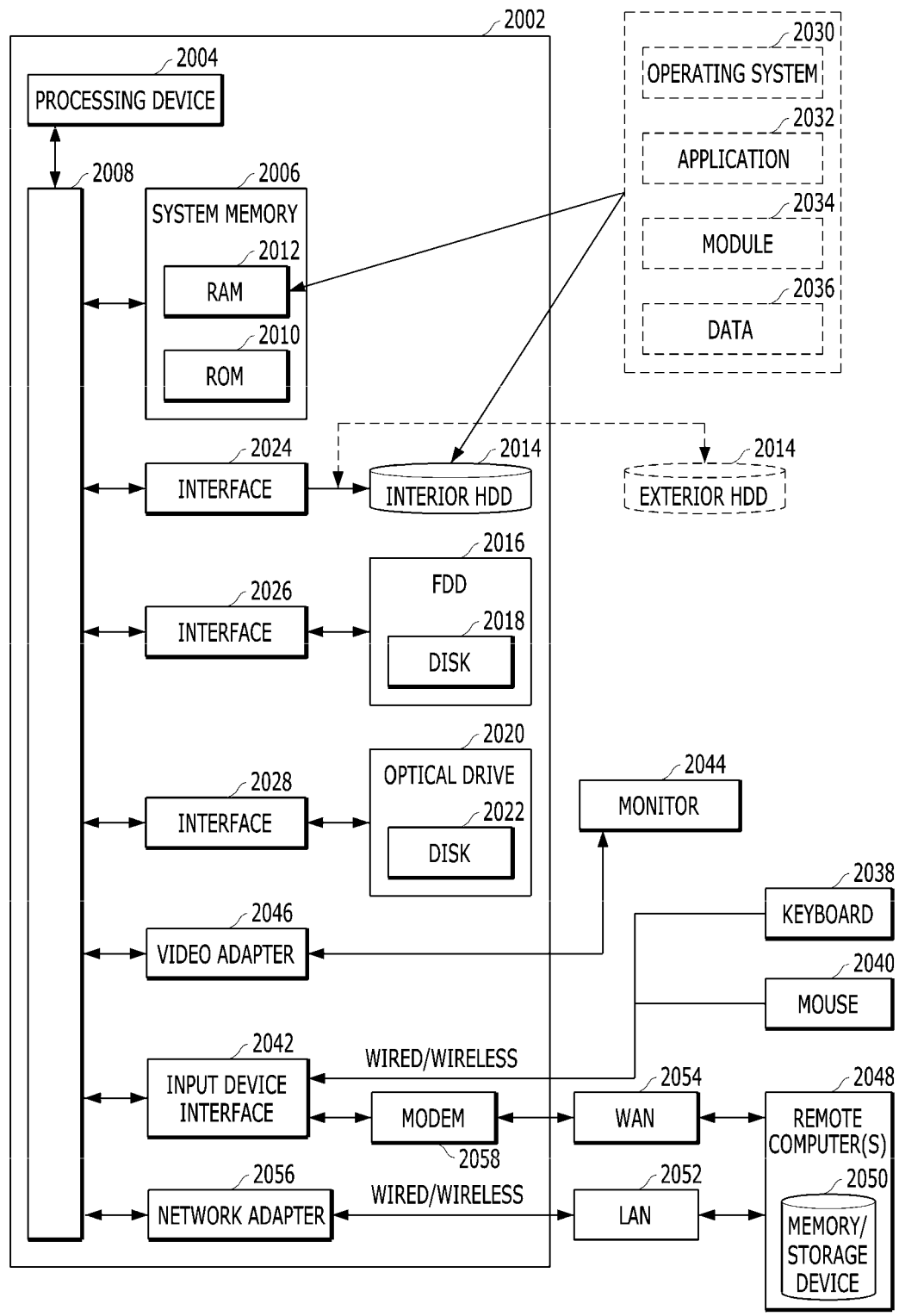
FIG. 18 is a schematic view of a computing environment according to an exemplary embodiment of the present disclosure.

FIG. 18 is a schematic view of a computing environment of the computing device 100 according to an exemplary embodiment of the present disclosure.

In the present disclosure, the component, the module, or the unit includes a routine, a procedure, a program, a component, and a data structure that perform a specific task or implement a specific abstract data type. Further, it will be well appreciated by those skilled in the art that the methods presented by the present disclosure can be implemented by other computer system configurations including a personal computer, a handheld computing device, microprocessor-based or programmable home appliances, and others (the respective devices may operate in connection with one or more associated devices) as well as a single-processor or multi-processor computing device, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computing device generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media.

The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 2000 that implements various aspects of the present disclosure including a computer 2002 is shown and the computer 2002 includes a processing device 2004, a system memory 2006, and a system bus 2008. The computer 200 in the present disclosure may be used intercompatibly with the computer device 100. The system bus 2008 connects system components including the system memory 2006 (not limited thereto) to the processing device 2004. The processing device 2004 may be a predetermined processor among various commercial processors. A dual processor and other multi-processor architectures may also be used as the processing device 2004.

The system bus 2008 may be any one of several types of bus structures which may be additionally interconnected to a local bus using any one of a memory bus, a peripheral device bus, and various commercial bus architectures. The system memory 2006 includes a read only memory (ROM) 2010 and a random access memory (RAM) 2012. A basic input/output system (BIOS) is stored in the non-volatile memories 2010 including the ROM, the EPROM, the EEPROM, and the like and the BIOS includes a basic routine that assists in transmitting information among components in the computer 2002 at a time such as in-starting. The RAM 2012 may also include a high-speed RAM including a static RAM for caching data, and the like.

The computer 2002 also includes an internal hard disk drive (HDD) 2014 (for example, EIDE and SATA), a magnetic floppy disk drive (FDD) 2016 (for example, for reading from or writing in a mobile diskette 2018), SSD and an optical disk drive 2020 (for example, for reading a CD-ROM disk 2022 or reading from or writing in other high-capacity optical media such as the DVD). The hard disk drive 2014, the magnetic disk drive 2016, and the optical disk drive 2020 may be connected to the system bus 2008 by a hard disk drive interface 2024, a magnetic disk drive interface 2026, and an optical drive interface 2028, respectively. An interface 2024 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 2002, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 2030, one or more application programs 2032, other program module 2034, and program data 2036 may be stored in the drive and the RAM 2012. All or some of the operating system, the application, the module, and/or the data may also be cached in the RAM 2012. It will be well appreciated that the present disclosure may be implemented in operating systems which are commercially usable or a combination of the operating systems.

A user may input instructions and information in the computer 2002 through one or more wired/wireless input devices, for example, pointing devices such as a keyboard 2038 and a mouse 2040. Other input devices (not illustrated) may include a microphone, an IR remote controller, a joystick, a game pad, a stylus pen, a touch screen, and others. These and other input devices are often connected to the processing device 2004 through an input device interface 2042 connected to the system bus 2008, but may be connected by other interfaces including a parallel port, an IEEE 1394 serial port, a game port, a USB port, an IR interface, and others.

A monitor 2044 or other types of display devices are also connected to the system bus 2008 through interfaces such as a video adapter 2046, and the like. In addition to the monitor 2044, the computer generally includes a speaker, a printer, and other peripheral output devices (not illustrated).

The computer 2002 may operate in a networked environment by using a logical connection to one or more remote computers including remote computer(s) 2048 through wired and/or wireless communication. The remote computer(s) 2048 may be a workstation, a server computer, a router, a personal computer, a portable computer, a microprocessor based entertainment apparatus, a peer device, or other general network nodes and generally includes multiple components or all of the components described with respect to the computer 2002, but only a memory storage device 2050 is illustrated for brief description. The illustrated logical connection includes a wired/wireless connection to a local area network (LAN) 2052 and/or a larger network, for example, a wide area network (WAN) 2054. The LAN and WAN networking environments are general environments in offices and companies and facilitate an enterprise-wide computer network such as Intranet, and all of them may be connected to a worldwide computer network, for example, the Internet.

When the computer 2002 is used in the LAN networking environment, the computer 2002 is connected to a local network 2052 through a wired and/or wireless communication network interface or an adapter 2056. The adapter 2056 may facilitate the wired or wireless communication to the LAN 2052 and the LAN 2052 also includes a wireless access point installed therein in order to communicate with the wireless adapter 2056. When the computer 2002 is used in the WAN networking environment, the computer 2002 may include a modem 2058, is connected to a communication server on the WAN 2054, or has other means that configure communication through the WAN 2054 such as the Internet, etc. The modem 2058 which may be an internal or external and wired or wireless device is connected to the system bus 2008 through the serial port interface 2042. In the networked environment, the program modules described with respect to the computer 2002 or some thereof may be stored in the remote memory/storage device 2050. It will be well known that an illustrated network connection is exemplary and other means configuring a communication link among computers may be used.

The computer 2002 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Method claims provide elements of various steps in a sample order, but the method claims are not limited to the presented specific order or hierarchical structure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for providing a benchmark result, performed by a computing device, comprising:
   obtaining a first input data including an inference task;
   determining a target model which is a subject of a benchmark for the inference task and determining at least one target node at which the inference task of the target model is to be executed, based on a candidate node list including candidate nodes recommended for the benchmark for the inference task, wherein the determined target model corresponds to an artificial intelligence-based model of which the benchmark for the inference task is performed at the at least one target node based on a dataset; and
   providing the benchmark result obtained by executing the target model at the at least one target node,
   wherein the candidate node list comprises:
      first nodes as the candidate nodes wherein the first nodes have an execution environment that supports a first operator included in an inputted source model; or
      second nodes as the candidate nodes, wherein the second nodes have an execution environment that does not support a first operator included in an inputted source model but supports a second operator that is able to replace the first operator, and wherein the second operator is different from the first operator.

2. The method of claim 1, wherein the candidate node list comprises identification information for each of the candidate nodes and estimated latency information for each of the candidate nodes when the target model is executed.

3. The method of claim 2, wherein an arrangement order between a first candidate node and a second candidate node is determined based on memory usage and CPU occupancy of the first candidate node and the second candidate node, when a difference in values of the estimated latency information between the first candidate node and the second candidate node among the candidate nodes is within a predetermined threshold range.

4. The method of claim 2, wherein an arrangement order of the candidate nodes included in the candidate node list is determined based on a size of a value of the estimated latency information.

5. The method of claim 1, wherein the candidate node list comprises:
power mode information indicating usage of a CPU core for at least some of the candidate nodes; and
fan mode information indicating usage of a fan for at least some of the candidate nodes.

6. The method of claim 1, wherein the candidate node list comprises:
information for at least one model supportable by each of the candidate nodes;
library information required to install at least one model supportable by each of the candidate nodes; and
power usage information indicating power usage obtained from power measurement sensors connected to the candidate nodes.

7. The method of claim 1, wherein a model size is determined based on size of the dataset of the first input data, and
wherein the candidate node list includes candidate nodes having a memory space exceeding the determined model size.

8. The method of claim 1, wherein the benchmark result comprises:
preprocessing time information required for preprocessing of inference of the target model at the at least one target node;
inference time information required for inference of the target model at the at least one target node;
preprocessing memory usage information used for preprocessing of inference of the target model at the at least one target node; and
inference memory usage information required for inference of the target model at the at least one target node.

9. The method of claim 1, wherein the benchmark result comprises:
quantitative information related to an inference time, which is obtained by repeated inferences of the target model in a predetermined number of times at the at least one target node; and
quantitative information related to memory usage for each of an NPU, a CPU, and a GPU, obtained by inference of the target model at the at least one target node.

10. The method of claim 1, wherein the providing the benchmark result obtained by executing the target model at the at least one target node comprises:
distinguishing a node capable of wireless communication and a node which is not capable of wireless communication at the at least one target node; and transmitting a benchmark task to the node capable of wireless communication corresponding to the node which is not capable of wireless communication, so that the node capable of wireless communication connects to the node which is not capable of wireless communication by using a serial communication, to obtain a benchmark result from the node which is not capable of wireless communication.

11. A method for providing a benchmark result, performed by a computing device, comprising:
obtaining a first input data including an inference task;
determining a target model which is a subject a benchmark for the inference task and determining at least one target node at which the inference task of the target model is to be executed, based on a candidate node list including candidate nodes recommended for the benchmark for the inference task, wherein the determined target model corresponds to an artificial intelligence-based model of which the benchmark for the inference task is performed at the at least one target node based on a dataset, and
providing the benchmark result obtained by executing the target model at the at least one target node,
wherein the providing the benchmark result when a third node unidentifiable from outside is included in the at least one target node comprises:
transmitting to the third node a first acknowledgement message including a benchmark task for benchmarking the target model at the third node, in response to receiving a first low power wireless signal from the third node; and
receiving from the third node a second low power wireless signal including a benchmark result generated by the third node.

12. The method of claim 11, wherein the providing the benchmark result when a third node unidentifiable from outside is included in the at least one target node further comprises:
determining that the benchmark task at the third node has failed and setting the third node to an inactive state, if the second low power wireless signal is not received for a predetermined threshold standby time; and
setting the third node to an active state in response to receiving a third low power wireless signal from the third node set as the inactive state.

13. The method of claim 11, wherein the first low power wireless signal comprises, whether the third node is performing a benchmark, a memory usage of the third node and hardware identification information of the third node.

14. The method of claim 11, wherein the benchmark task included in the first acknowledgment message comprises: target model information downloadable by the third node, and node configuration information used for converting the target model that the third node has downloaded, and
wherein the benchmark result generated by the third node comprises a result obtained by executing the target model in an execution environment of the third node based on the target model information and the node configuration information.

15. A method for providing a benchmark result, performed by a computing device, comprising:
obtaining a first input data including an inference task;
determining a target model which is a subject of a benchmark for the inference task and determining at least one target node at which the inference task of the target model is to be executed, based on a candidate node list including candidate nodes recommended for the benchmark for the inference task, wherein the determined target model corresponds to an artificial intelligence-based model of which the benchmark for the inference task is performed at the at least one target node based on a dataset, and providing the benchmark result obtained by executing the target model at the at least one target node, wherein in response to receiving second input data selecting the at least one target node in the candidate node list, i) the at least one target node is determined and ii) information for recommending a target model supportable by the at least one target node to determine the target model is provided.

16. The method of claim 15, wherein the information for recommending the target model comprises: identification information corresponding to a recommended target model, and software version information of a recommended target model.

17. A computer program stored in a computer readable medium, wherein the computer program allows a computing device to perform following operations to provide a benchmark result when executed by the computing device, and wherein the operations comprise:

obtaining a first input data including an inference task;

determining a target model which is a subject of a benchmark for the inference task and determining at least one target node at which the inference task of the target model is to be executed, based on a candidate node list including candidate nodes recommended for the benchmark for the inference task, wherein the determined target model corresponds to an artificial intelligence-based model of which the benchmark for the inference task is performed at the at least one target node based on a dataset; and providing the benchmark result obtained by executing the target model at the at least one target node, wherein the candidate node list comprises:

first nodes as the candidate nodes wherein the first nodes have an execution environment that supports a first operator included in an inputted source model; or second nodes as the candidate nodes, wherein the second nodes have an execution environment that does not support a first operator included in an inputted source model but supports a second operator that is able to replace the first operator, and wherein the second operator is different from the first operator.

18. A computing device for generating a benchmark result, comprising:

at least one processor; and a memory, wherein the at least one processor:

obtains a first input data including an inference task and a dataset;

determine a target model which is a subject of a benchmark for the inference task and determining at least one target node at which the inference task of the target model is to be executed, based on a candidate node list including candidate nodes recommended for the benchmark for the inference task, wherein the determined target model corresponds to an artificial intelligence-based model of which the benchmark for the inference task is performed at the at least one target node based on a dataset; and provides the benchmark result obtained by executing the target model at the at least one target node, wherein the candidate node list comprises:

first nodes as the candidate nodes wherein the first nodes have an execution environment that supports a first operator included in an inputted source model; or second nodes as the candidate nodes, wherein the second nodes have an execution environment that does not support a first operator included in an inputted source model but supports a second operator that is able to replace the first operator, and wherein the second operator is different from the first operator.

* * * * *